United States Patent
Song

(10) Patent No.: US 8,837,069 B2
(45) Date of Patent: Sep. 16, 2014

(54) METHOD AND APPARATUS FOR MANAGING READ OR WRITE ERRORS

(75) Inventor: Jae Ik Song, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 27 days.

(21) Appl. No.: 13/459,001

(22) Filed: Apr. 27, 2012

(65) Prior Publication Data

US 2013/0038961 A1    Feb. 14, 2013

(30) Foreign Application Priority Data

Apr. 27, 2011    (KR) .......................... 10-2011-0039708

(51) Int. Cl.
G11B 5/09    (2006.01)
(52) U.S. Cl.
USPC ........................................................... 360/53
(58) Field of Classification Search
None
See application file for complete search history.

(56) References Cited

U.S. PATENT DOCUMENTS

| 6,034,831 | A  | * | 3/2000  | Dobbek et al. ................ 360/53 |
| 6,094,317 | A  | * | 7/2000  | Chung ............................ 360/53 |
| 6,169,710 | B1 | * | 1/2001  | Arai ............................ 369/30.11 |
| 6,490,691 | B1 | * | 12/2002 | Kimura et al. ................ 714/5.1 |
| 7,440,221 | B2 |   | 10/2008 | Tsuchinaga |
| 7,982,994 | B1 |   | 7/2011  | Erden |
| 8,179,627 | B2 |   | 5/2012  | Chang |
| 8,270,256 | B1 |   | 9/2012  | Juang |
| 2007/0030588 | A1 |   | 2/2007 | Tsuchinaga |
| 2011/0085266 | A1 |   | 4/2011 | Kanai |
| 2011/0222186 | A1 |   | 9/2011 | Itakura |
| 2011/0292545 | A1 |   | 12/2011 | Katada |
| 2012/0060073 | A1 |   | 3/2012 | Itakura |
| 2012/0069466 | A1 |   | 3/2012 | Okamoto |
| 2012/0082019 | A1 |   | 4/2012 | Harigae |
| 2012/0099216 | A1 |   | 4/2012 | Grobis |
| 2012/0162808 | A1 |   | 6/2012 | Masuda |
| 2012/0194937 | A1 |   | 8/2012 | Tagami |

OTHER PUBLICATIONS

Garth Gibson, Directions for Shingled-Write and Two-Dimensional Magnetic Recording System Architectures: Synergies with Solid-State Disks, Carnegie Mellon University, May 2009, pp. 1-2, Pittsburgh, US.

* cited by examiner

Primary Examiner — Wayne Young
Assistant Examiner — Mark Fischer
(74) Attorney, Agent, or Firm — Cesari & Reed LLP; Kirk A. Cesari; Christian W. Best

(57) ABSTRACT

Methods and apparatuses for managing read or write errors are disclosed. In one embodiment, a method may comprise receiving a command to perform an operation associated with first data and a first address of a data storage medium, performing the operation at the first address, retrying the operation when the operation did not complete successfully, and storing the first data to a second address when a first threshold is exceeded. In another embodiment, an apparatus may comprise a processor configured to: receive a command to perform an operation associated with first data and a first address of a data storage medium, perform the operation at the first address, retry the operation when the operation did not complete successfully, and store the first data to a second address when a first threshold is exceeded.

20 Claims, 24 Drawing Sheets

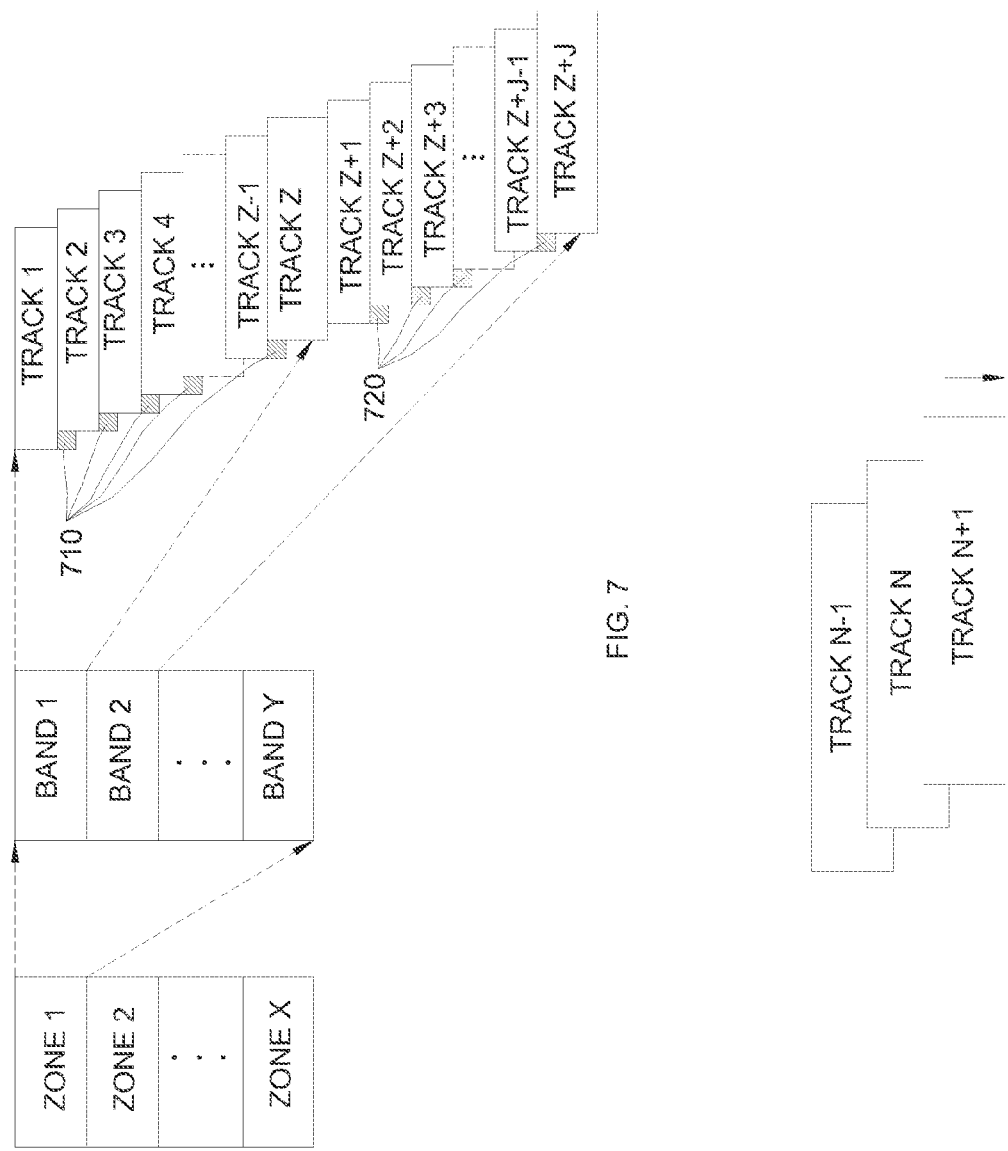

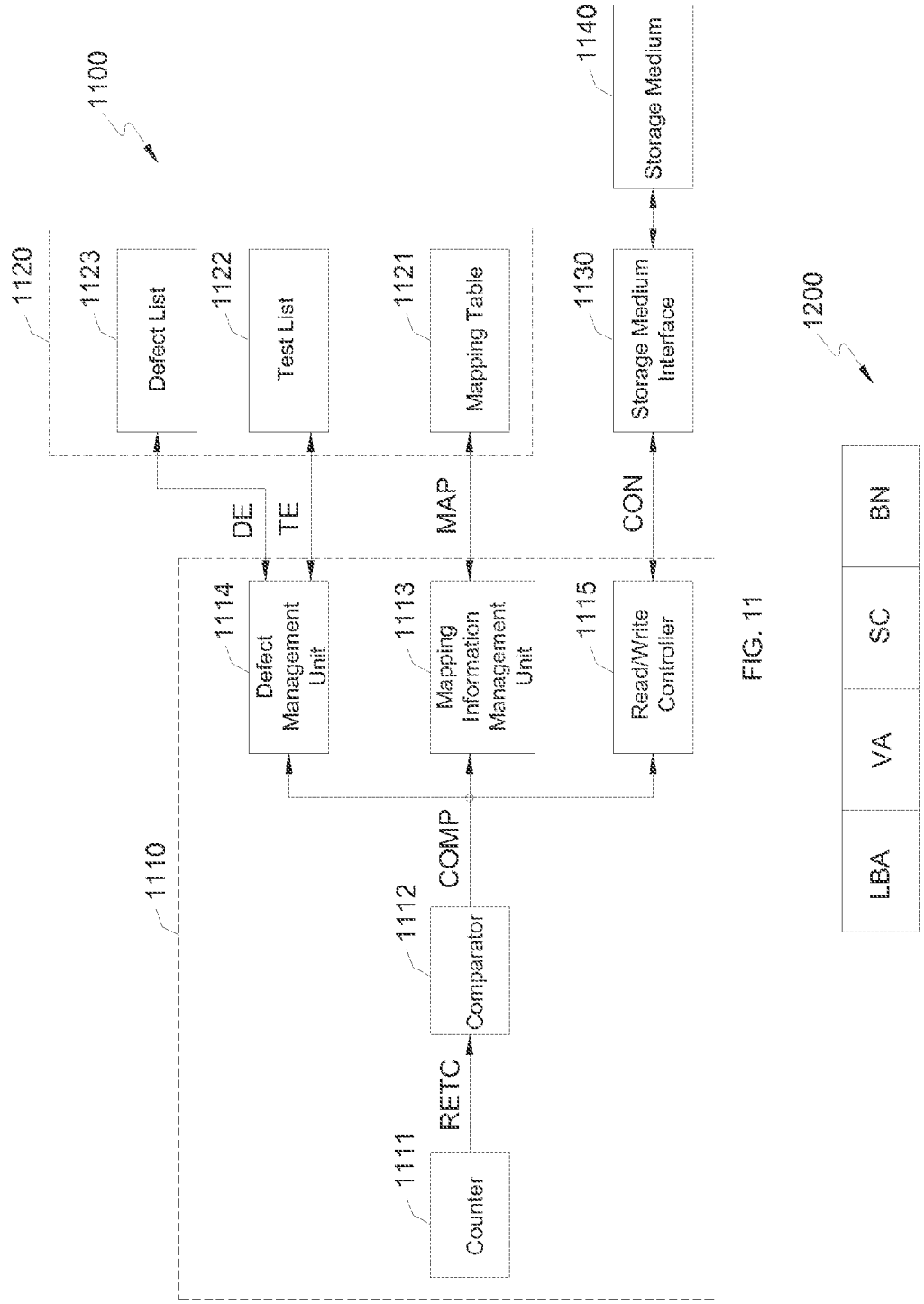

ically, it claims priority under 35 U.S.C. §119(a) of
METHOD AND APPARATUS FOR MANAGING READ OR WRITE ERRORS

CROSS-REFERENCE TO RELATED APPLICATIONS

This application claims priority under 35 U.S.C. §119(a) of Korean Patent Application No. 2011-0039708, filed on Apr. 27, 2011, the entire disclosure of which is hereby incorporated by reference.

BACKGROUND OF THE INVENTION

1. Field of the Invention

The present disclosure relates to a storage device and a computer system, and particularly, to a method for controlling a read or write operation when an error occurs during a read or write operation, a storage device and a computer system using the method.

2. Background of the Invention

A disk drive, one of storage devices, is configured to operate a computer system by reading or writing data from/on a storage medium, in response to a command generated from a host device.

Various writing methods are being researched to enhance recording density of the disk drive. Also, a new method is required for access a storage medium suitable for a new writing method to enhance recording density.

SUMMARY OF THE INVENTION

In one embodiment, a method may comprise receiving a command to perform an operation associated with first data and a first address of a data storage medium, performing the operation at the first address, retrying the operation when the operation did not complete successfully, and storing the first data to a second address when a first threshold is exceeded.

In another embodiment, an apparatus may comprise a processor configured to: receive a command to perform an operation associated with first data and a first address of a data storage medium, perform the operation at the first address, retry the operation when the operation did not complete successfully, and store the first data to a second address when a first threshold is exceeded.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 7 is a view showing an embodiment of a storage medium using a shingle write method;

FIGS. 8A and 8B are views for explaining restriction conditions when writing data using a shingle write method;

FIG. 11 is a block diagram of a storage device according to an embodiment of the present invention;

FIG. 12 is a view showing an embodiment of mapping information stored in a mapping table of FIG. 11;

DETAILED DESCRIPTION OF THE INVENTION

An aspect of the detailed description is to provide a method for controlling a read operation method capable of efficiently controlling an error occurring during a read operation. Another aspect of the detailed description is to provide a method for controlling a write operation method capable of efficiently controlling an error occurring during a write operation. Still another aspect of the detailed description is to provide a storage device capable of efficiently controlling an error occurring during a read or write operation. Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
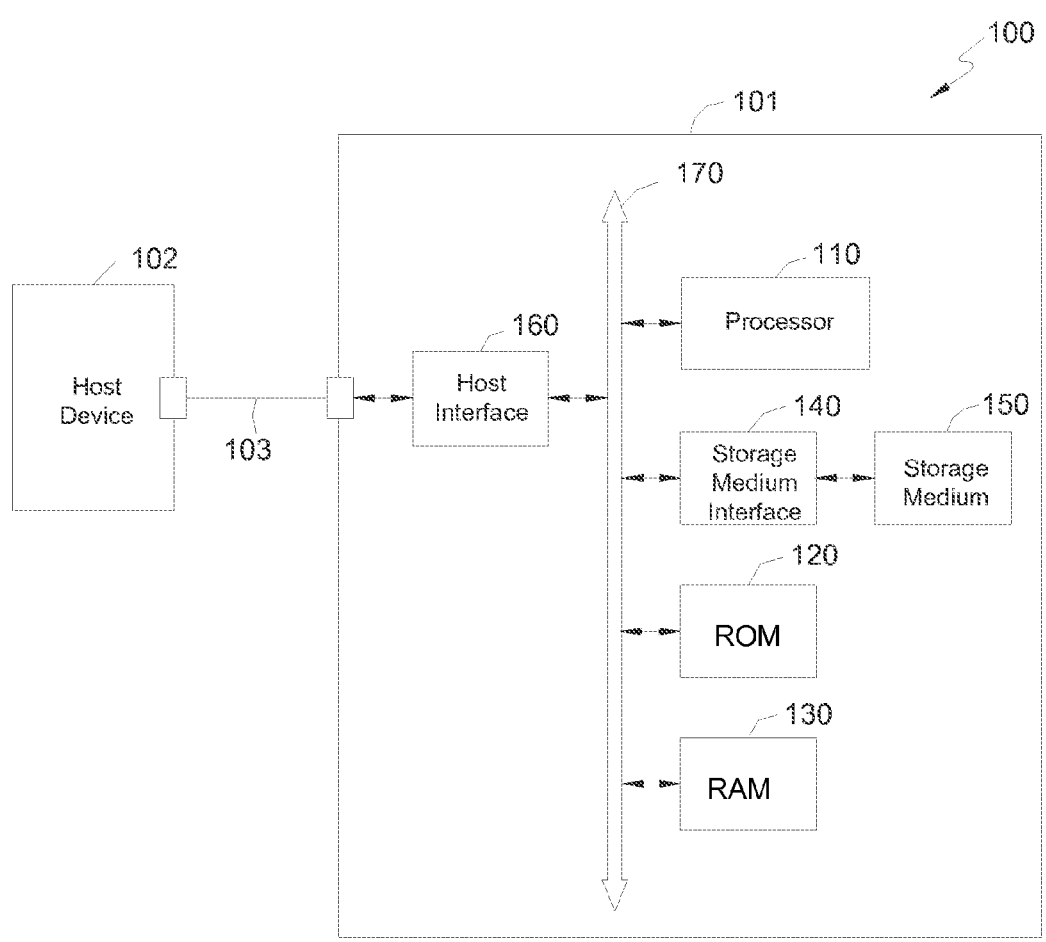
FIG. 1A is a block diagram showing a computer system according to an embodiment of the present invention.

FIG. 1A is a block diagram showing a computer system 100 according to an embodiment of the present invention.

Referring to FIG. 1A, the computer system 100 according to an embodiment of the present invention comprises a storage device 101, a host device 102 and a connector 103.

More specifically, the storage device 101 includes a processor 110, a Read Only Memory (ROM) 120, a Random Access Memory (RAM) 130, a storage medium interface 140, a storage medium 150, a host interface 160 and a bus 170.

The host device 102 is configured to generate a command for operating the storage device 101, to transmit the command to the storage device 101 connected to the host device 102 through the connector 103, and to perform a process for transmitting or receiving data to/from the storage device 101 according to the command.

The connector 103, a means for electrically connecting an interface port of the host device 102 with an interface port of the storage device 101, may include a data connector and a power connector. As an example, in case of using a Serial Advanced Technology Attachment (SATA) interface, the connector 103 may include a 7-pin SATA data connector and a 15-pin SATA power connector.

The components of the storage device 101 will be explained in more details.

The processor 110 is configured to analyze a command, and to control the components of the storage device 101 based on an analyzed result. The processor 110 includes a code object management unit, and loads code objects stored in the storage medium 150 to the RAM 130 using the code object management unit. The processor 110 loads, to the RAM 130, code objects for executing a read operation controlling method shown in FIGS. 14 to 16 and a write operation controlling method shown in FIGS. 19 and 20.

Figure 14:
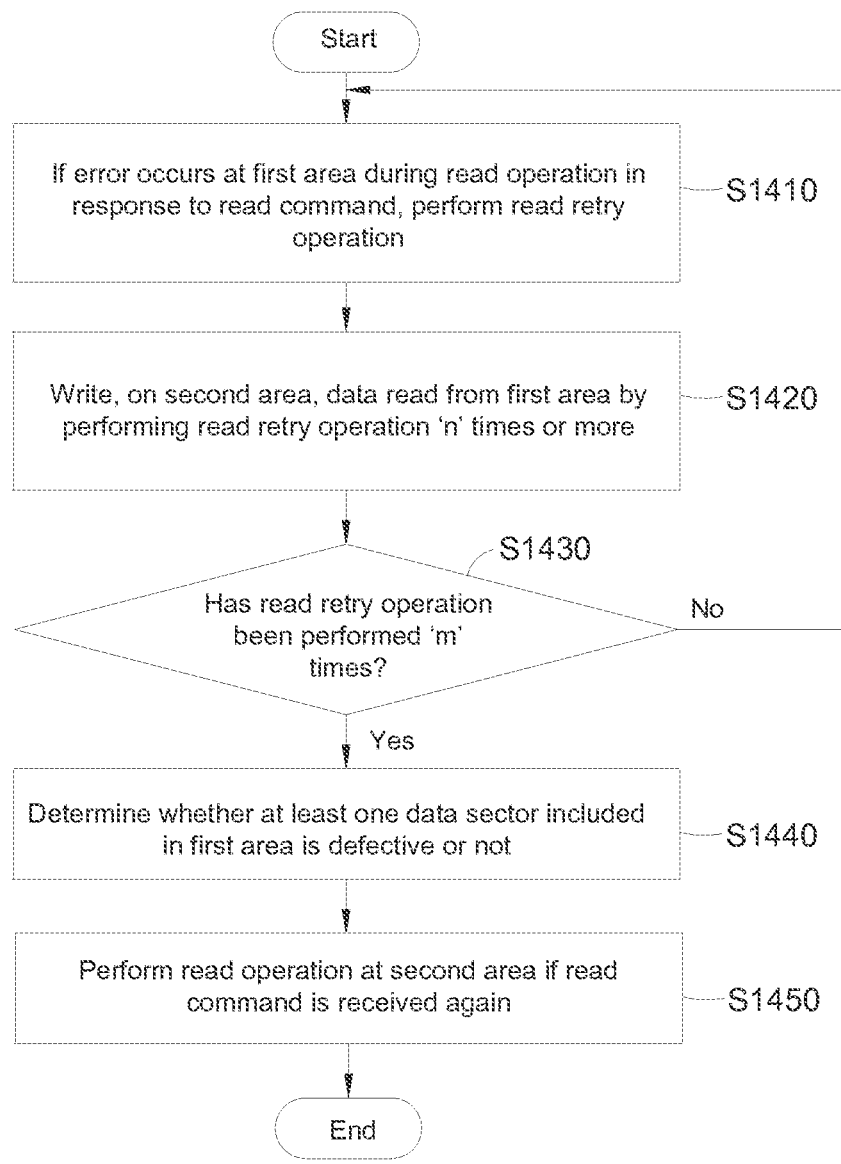
FIG. 14 is a flowchart showing a method for controlling a read operation according to an embodiment of the present invention.
Figure 15:
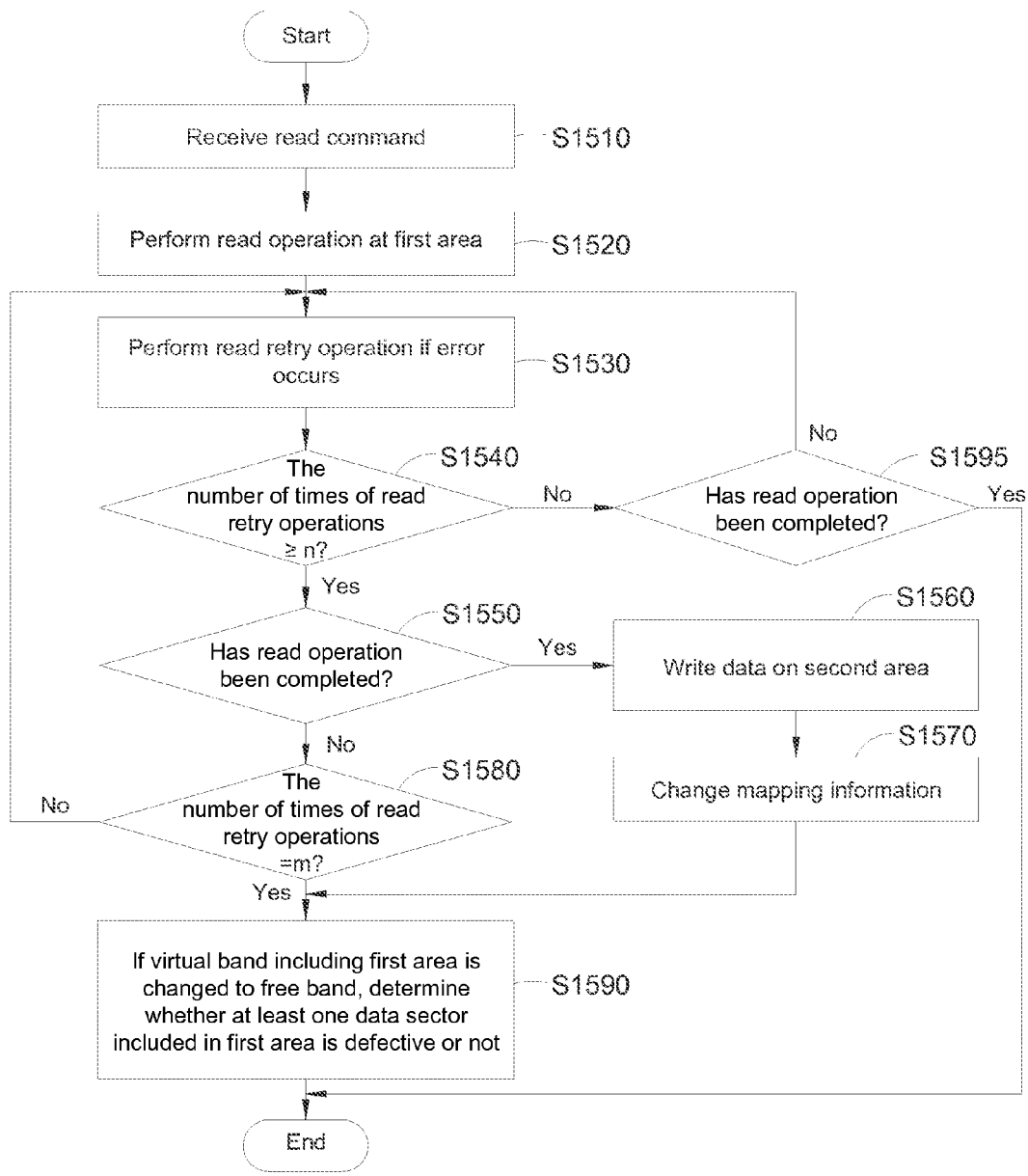
FIG. 15 is a flowchart showing the method for controlling a read operation of FIG. 14 in more details.
Figure 16:
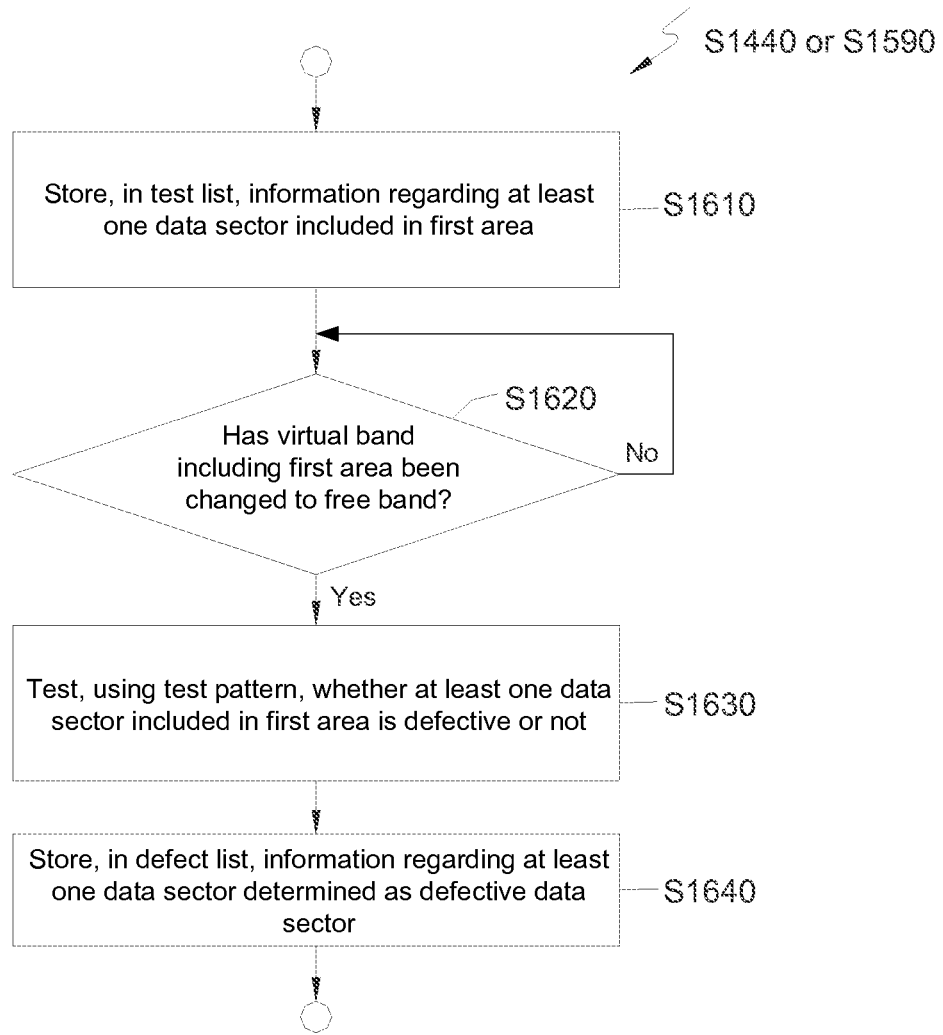
FIG. 16 is a flowchart showing S1440 of FIG. 14 or S1590 of FIG. 15 in more details.
Figure 19:
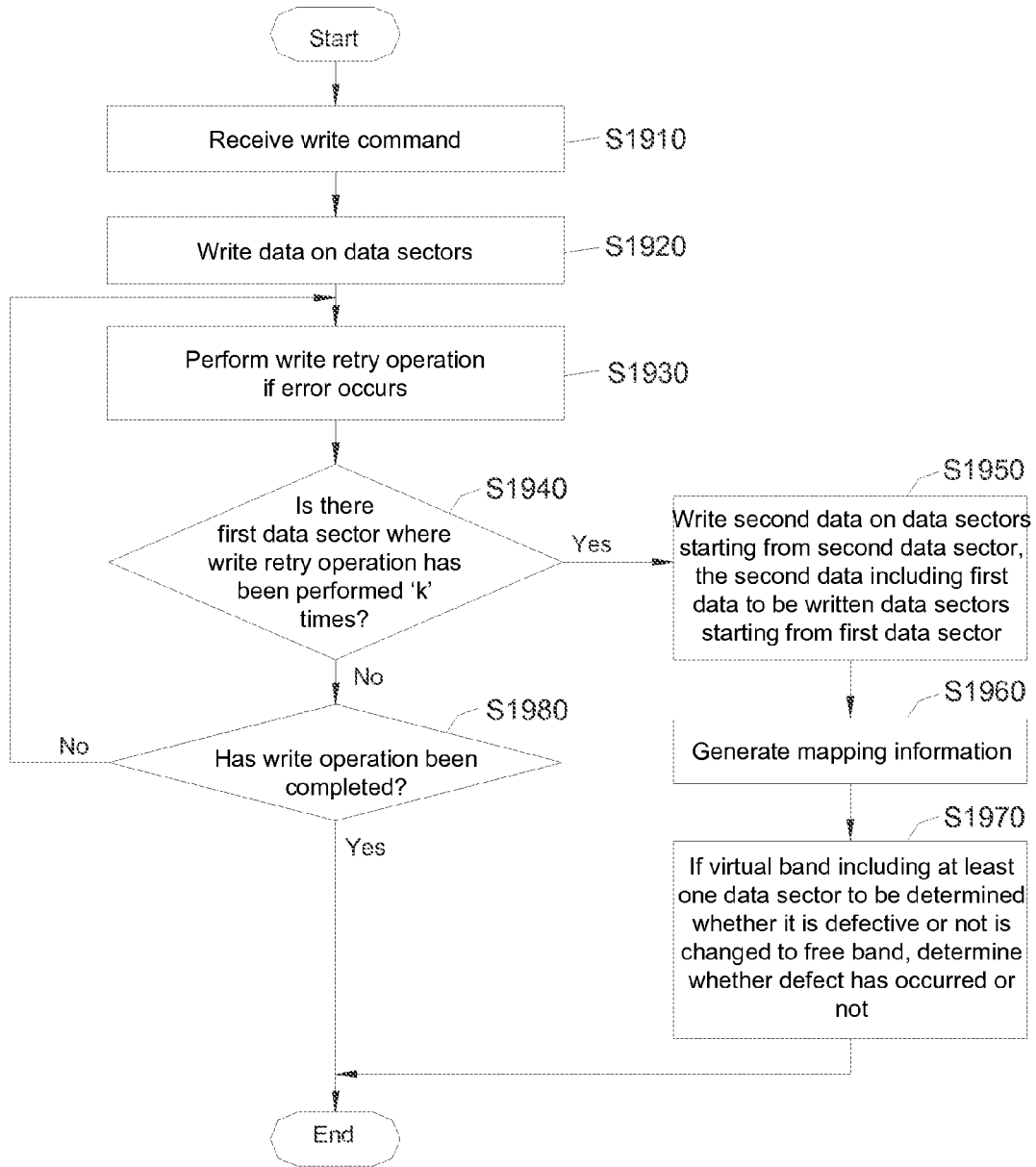
FIG. 19 is a flowchart showing a method for controlling a write operation according to an embodiment of the present invention.
Figure 20:
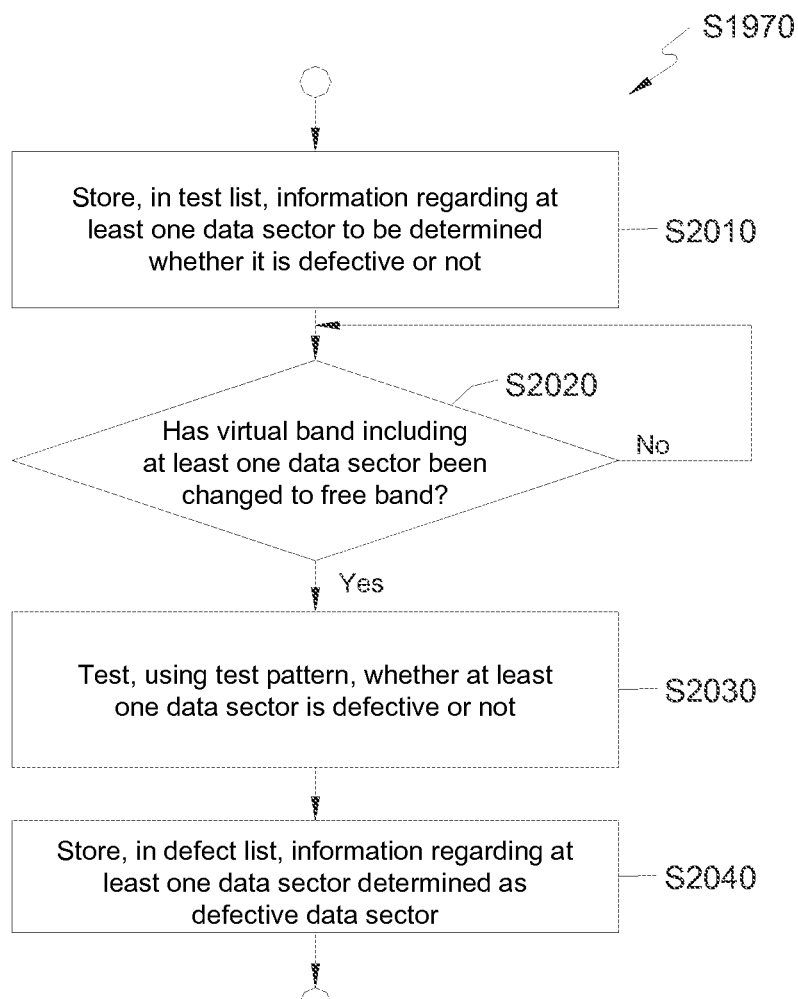
FIG. 20 is a flowchart showing S1980 of FIG. 19 in more details.

Then, the processor 110 may execute a task with respect to a read operation controlling method shown in FIGS. 14 to 16 and a write operation controlling method shown in FIGS. 19 and 20. The read operation controlling method and the write operation controlling method executed by the processor 110 will be explained in more details with reference to FIGS. 14 to 16, and FIGS. 19 and 20.

The ROM 120 stores therein program codes and data required to operate the data storage device. The program codes and data stored in the ROM 120 or the storage medium 150 are loaded to the RAM 130 under control of the processor 110.

The storage medium 150, a main storage medium of the storage device, may include a disk or a non-volatile semiconductor memory device. The storage device may include a disk drive, for example. A detailed configuration of a head disk assembly 300 including a disk and a head in a disk drive is illustrated in FIG. 3.

Figure 3:
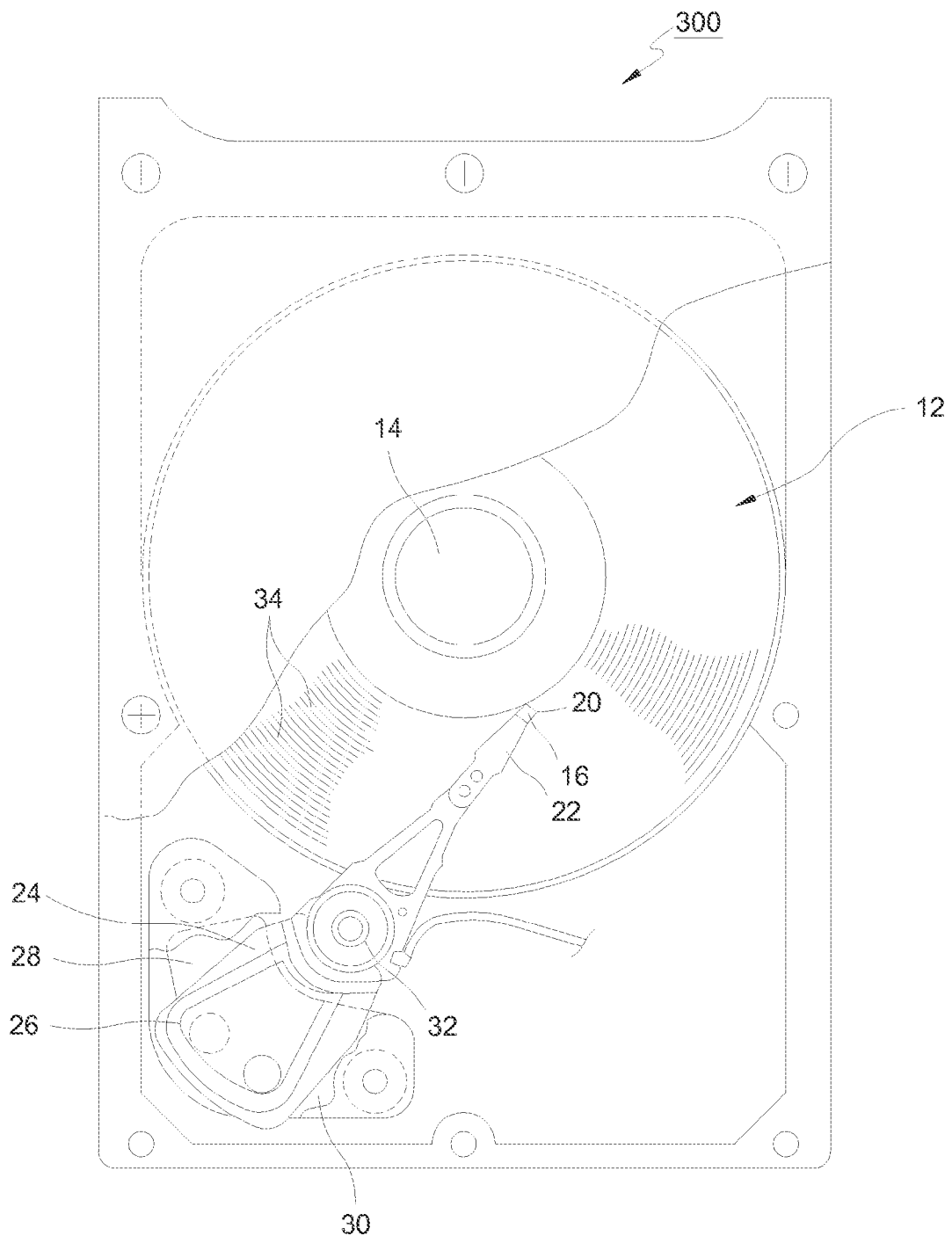
FIG. 3 is a planar view of a head disk assembly of a disk drive according to an embodiment of the present invention.

FIG. 3 is a planar view of a head disk assembly 300 of a disk drive according to an embodiment of the present invention.

Referring to FIG. 3, the head disk assembly 300 includes at least one disk 12 rotated by a spindle motor 14. The disk drive also includes a head 16 positioned close to the surface of the disk 12.

The head 16 may read data or write data from/onto the disk 12 being rotated, by sensing a magnetic field of each disk 12 and magnetizing the magnetic field of the disk 12. Generally, the head 16 is coupled to the surface of each disk 12. Even if a single head 16 is shown in the drawings, it should be understood that the single head 16 is composed of a recording head for magnetizing the disk 12 and a reading head separated from the recording head so as to detect a magnetic field of the disk 12. The reading head is implemented from a magneto-resistive (MR) device. The head 16 is called 'magnetic head' or 'transducer'.

The head 16 may be integrated with a slider 20. The slider 20 has a structure to generate air bearing between the head 16 and the surface of the disk 12. The slider 20 is coupled to a head gimbal assembly 22. The head gimbal assembly 22 is attached to an actuator arm 24 having a voice coil 26. The voice coil 26 is positioned close to a magnetic assembly 28 so as to define a voice coil motor (VCM) 30. Current supplied to the voice coil 26 generates torque for rotating the actuator arm 24, with respect to a bearing assembly 32. The rotation of the actuator arm 24 moves the head 16 across the surface of the disk 12.

Information is generally stored in annular tracks of the disk 12. Each track 34 includes a plurality of sectors. The configuration of the plurality of sectors included in a single track is shown in FIG. 5.

Figure 5:
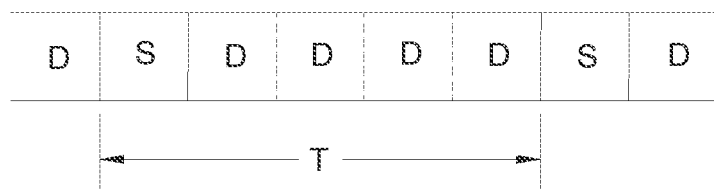
FIG. 5 is a view showing a sector structure of a single track of a disk, one embodiment of a storage medium applicable to the present invention.

FIG. 5 is a view showing a structure of a plurality of sectors of a single track in a disk, an embodiment of a storage medium according to the present invention.

As shown in FIG. 5, a single servo sector (T) is composed of a servo area (S) and a data area, and the data area includes a plurality of data sectors (D). However, the single servo sector (T) may include a single data sector (D). The data sector (D) is also called a 'sector'. Signals shown in FIG. 6 are recorded on the servo areas (S).

Figure 6:
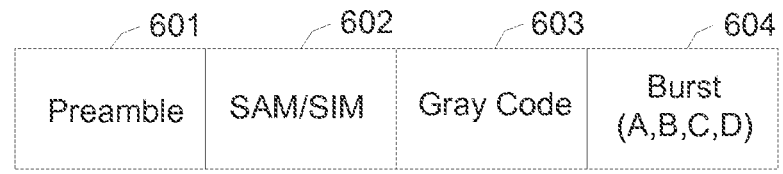
FIG. 6 is a view showing a structure of a servo area of FIG. 5.

FIG. 6 is a view showing a structure of the servo area (S) of FIG. 5.

On the servo area (S), signals of FIG. 6 are recorded. The signals include a preamble 601, a servo synchronization indication signal (SAM/SIM) 602, a gray code 603 and a burst 604 (A, B, C and D).

The preamble 601 provides clock synchronization when reading servo information, and provides a constant timing margin by having a gap prior to the servo sector (T). And, the preamble 601 is used to determine a gain of an automatic gain control (AGC) circuit.

The servo synchronization indication signal 602 is composed of a servo address mark (SAM) and a servo index mark (SIM). The servo address mark is a signal indicating start of a servo sector, and the servo index mark is a signal indicating start of a first servo sector in a track.

The gray code 603 provides track information, and the burst signals 604 are used to control the head 16 to follow a central part of the track 34. As an example, the burst signals are implemented as four patterns 'A, B, C and D'. That is, a position error signal (PES) for tracking control is generated from a combination of the four burst patterns A, B, C and D.

The disk 12 is divided into a maintenance cylinder area inaccessible by a user, and a user data area accessible by a user. The maintenance cylinder area is also called 'system area'. All types of information required to control the disk drive is stored in the maintenance cylinder area. Alternatively, information required to execute the read operation controlling method and the write operation controlling method of the present invention may be stored in the maintenance cylinder area. Especially, a mapping table for converting a logical block address (LBA) to a virtual address (VA) based on a virtual zone or a virtual band may be stored in the maintenance cylinder area.

The head 16 moves across the surface of the disk 12 so as to read or record information from/onto another track. A plurality of code objects for implementing various functions of the disk drive may be stored in the disk 12. As an example, a code object for performing an MP3 player function, a code object for performing a navigation function, a code object for performing various video games, etc. may be stored in the disk 12.

Referring to FIG. 1A, the storage medium interface 140 is a means configured to allow the processor 110 to write or read information by accessing the storage medium 150. The storage medium interface 140 of the storage device implemented as a disk drive may include a servo circuit for controlling the head disk assembly, and a read/write channel circuit for performing a signal process for reading/writing data.

The host interface 160 is a means configured to perform data transmission/reception (transception) with the host device 102, such as a personal computer and a mobile device. For instance, the host interface 160 may be implemented as various interfaces such as a Serial Advanced Technology Attachment (SATA) interface, a Parallel Advanced Technology Attachment (PATA) interface, and a Universal Serial Bus (USB) interface.

The bus 170 is configured to transmit information between the components of the storage device.

Next, a software operating system of a hard disk drive, an example of the storage device will be explained in more details with reference to FIG. 2. FIG. 2 is a view showing a software operating system of the storage device 101 of FIG. 1A or a storage device 101' of FIG. 1B.

As shown in FIG. 2, a plurality of code objects 1~N are stored in a disk 150A, a storage medium of a hard disk drive (HDD).

In the ROM 120, boot images and packed RTOS images are stored.

A plurality of code objects 1~N are stored in a disk 150A, a storage medium of a hard disk drive (HDD). Code objects stored in the disk 150A may include not only code objects required to operate the disk drive, but also code objects associated with various functions which can be extended to the disk drive. Code objects for executing the read operation controlling method shown in FIGS. 14 to 16 and the write operation controlling method shown in FIGS. 19 and 20 are stored in the disk 150A, a storage medium of the HDD. Alternatively, the code objects for executing the read operation controlling method shown in FIGS. 14 to 16 and the write operation controlling method shown in FIGS. 19 and 20 may be stored in the ROM 120, rather than in the disk 150A. And, code objects for performing various functions such as an MP3 player function, a navigation function and a video game function may be stored in the disk 150A.

Unpacked RTOS images compression-released by reading boot images from the ROM 120 during a booting process are loaded to the RAM 130. Code objects required to execute the host interface stored in the disk 150A, a storage medium of the HDD are loaded to the RAM 130. A data area for storing data is allocated to the RAM 130.

A channel circuit 200 has therein circuitry required to perform signal processing for reading/writing data. A servo circuit 210 has therein circuitry required to control a head disk assembly 300 for reading/writing data.

A Real Time Operating System (RTOS) 110A is a real-time operating system program, which is a multiple-program operating system using a disk. The RTOS 110A performs real-time multiple processing at a foreground having a high priority, and performs integrated processing at a background having a low priority per task. And, the RTOS 110A loads code objects from the disk, and unloads code objects to the disk.

The RTOS 110A manages Code Object Management Unit (COMU, 110-1), Code Object Loader (COL, 110-2), Memory Handler (MH, 110-3), Channel Control Module (CCM, 110-4), and Servo Control Module (SCM, 110-5), thereby executing a task corresponding to a requested command. The RTOS 110A further manages an application program 220.

More specifically, the RTOS 110A loads code objects required to control the disk drive to the RAM 130 during a booting process of the disk drive. Therefore, once the booting process is executed, the disk drive can be operated by using the code objects loaded to the RAM 130.

The COMU 110-1 is configured to store positional information regarding positions where the code objects have been recorded, and to perform bus arbitration. Information regarding priorities of tasks being executed is also stored in the COMU 110-1. And, the COMU 110-1 is configured to manage Task Control Block (TCB) information and stack information required to perform tasks corresponding to code objects.

The COL 110-2 is configured to load code objects stored in the disk 150A (a storage medium of the HDD) to the RAM 130, or is configured to unload code objects stored in the RAM 130 to the disk 150A using the COMU 110-1. Therefore, the COL 110-2 can load, to the RAM 130, code objects for executing the read operation controlling method shown in FIGS. 14 to 16 and the write operation controlling method shown in FIGS. 19 and 20.

The RTOS 110A can execute the methods of FIGS. 14 to 16 and FIGS. 19 and 20 to be later explained, using the code objects loaded to the RAM 130.

The MH 110-3 reads or writes data from/onto the ROM 120 and the RAM 130.

The CCM 110-4 controls channels required to perform signal processing for reading/writing data. And, the SCM 110-5 controls a servo including a head disk assembly for reading/writing data.

Figure 1B:
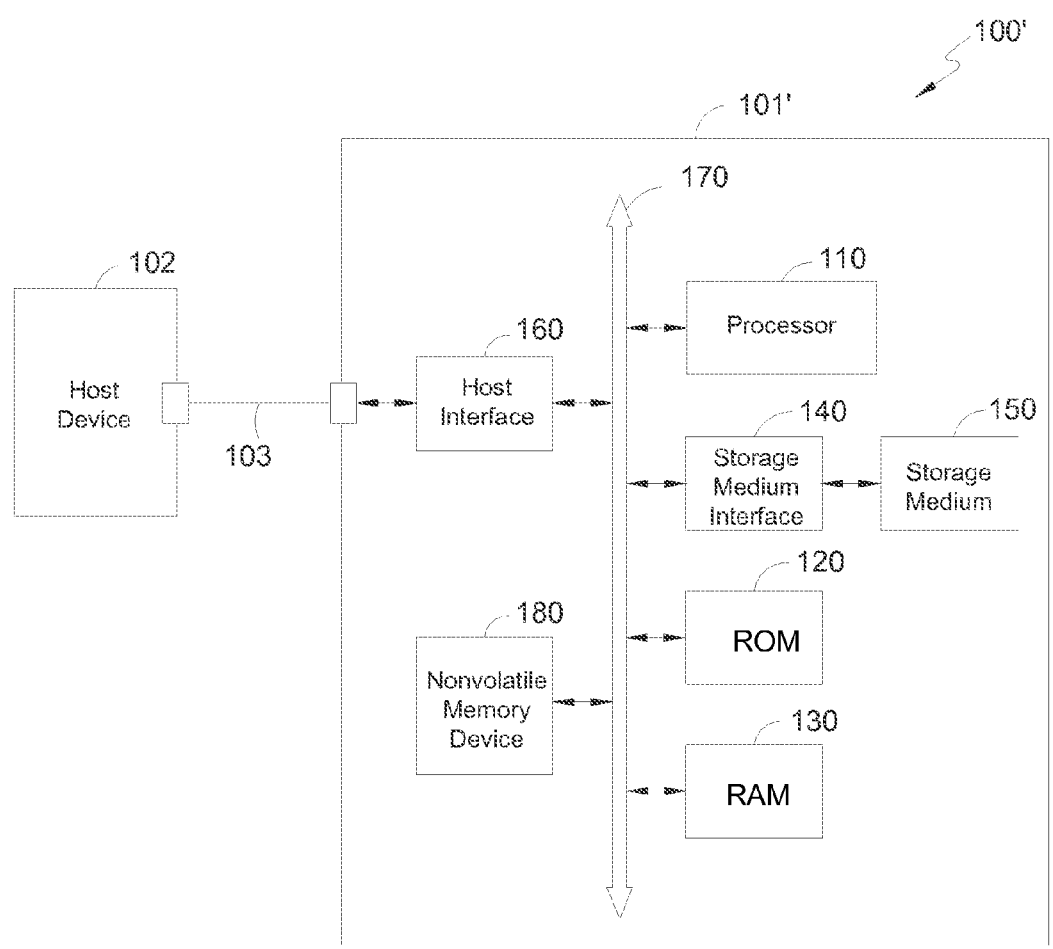
FIG. 1B is a block diagram showing a computer system according to another embodiment of the present invention.
Figure 2:
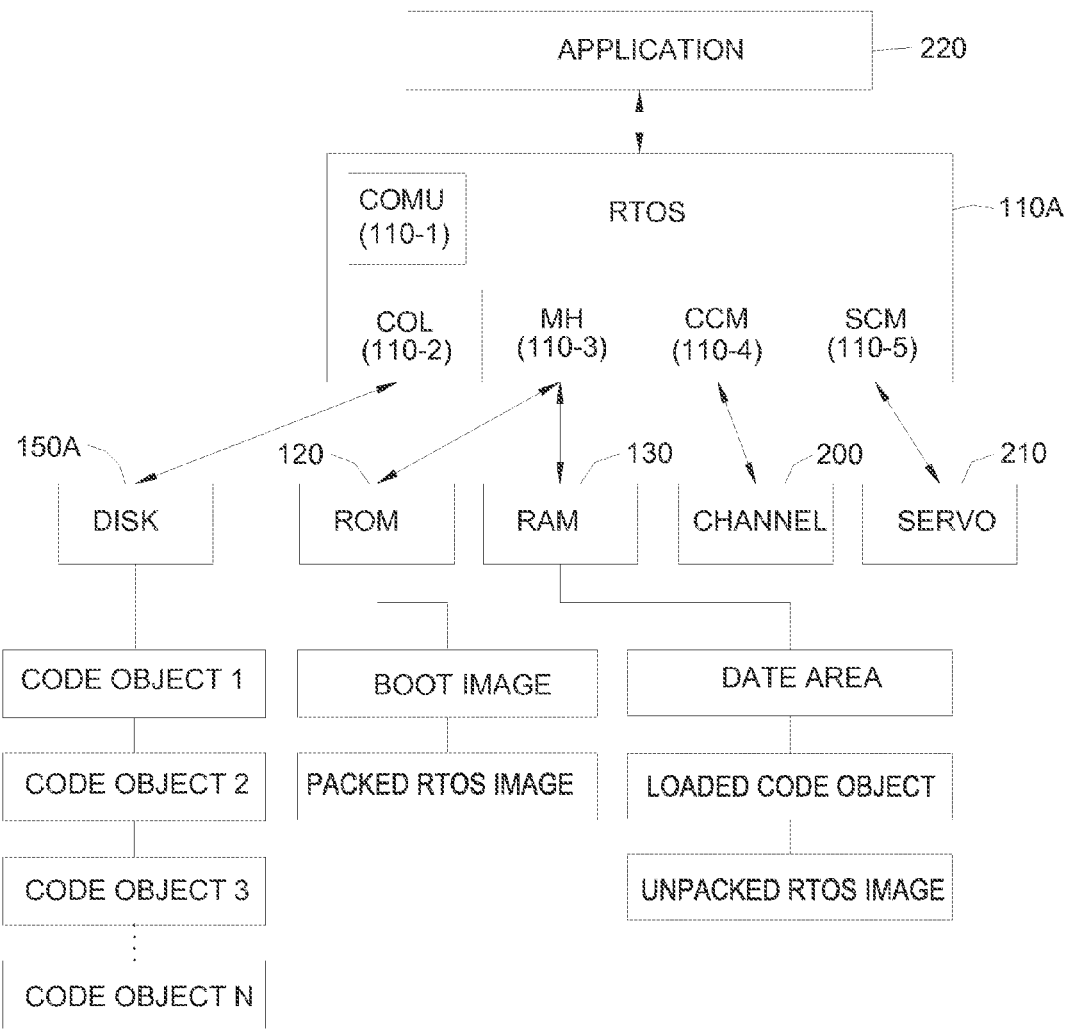
FIG. 2 is a view showing a software operating system of a storage device of FIG. 1A or FIG. 1B.

FIG. 1B is a block diagram showing a computer system 100' according to another embodiment of the present invention.

A storage device 101' of the computer system 100' of FIG. 1B further comprises a non-volatile memory device 180, in addition to the components of the storage device 101 of FIG. 1A. A storage medium 150 of FIG. 1B may be implemented as a disk. The non-volatile memory device 180 may be implemented as a non-volatile semiconductor memory device. As an example, the non-volatile memory device 180 may be implemented as a flash memory, PRAM (Phase change RAM), FRAM (Ferroelectric RAM), MRAM (Magnetic RAM), etc.

In the non-volatile memory device 180, part or all of data to be stored in the storage device 101' may be stored. As an example, all types of information required to control the storage device 101' may be stored in the non-volatile memory device 180.

Program codes and information for executing the read operation controlling method shown in FIGS. 14 to 16 and the write operation controlling method shown in FIGS. 19 and 20 may be stored in the non-volatile memory device 180. Code objects for implementing various functions of the storage device may be stored in the non-volatile memory device 180. If a mapping table is stored in the non-volatile memory device 180, the storage device may load the mapping table stored in the non-volatile memory device 180 to the RAM 130.

Explanations about the aforementioned components of the computer system of FIG. 1A will be omitted.

Figure 4A:
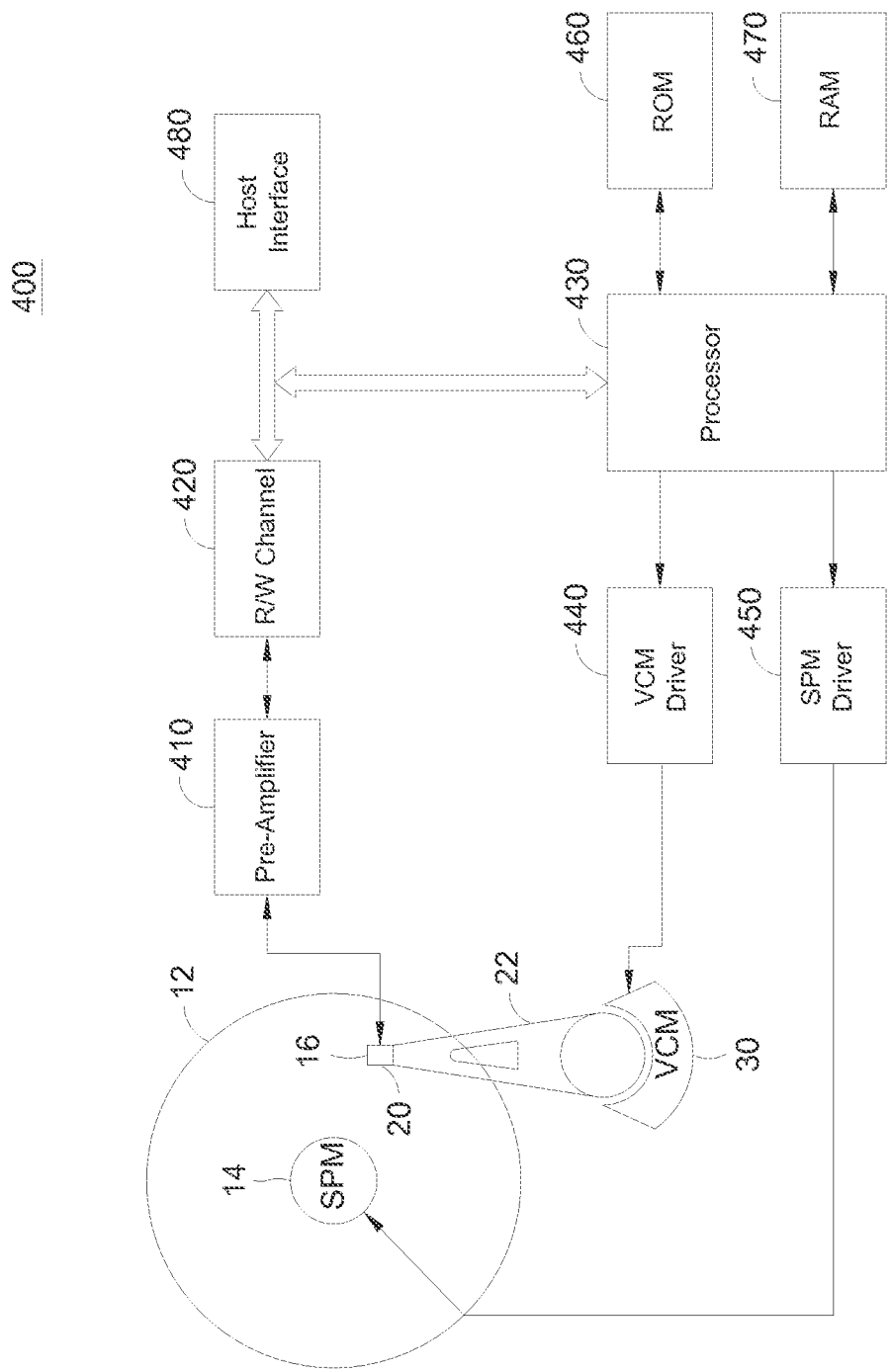
FIG. 4A is a view showing a configuration of electric circuitry of a disk drive, one embodiment of a storage device of FIG. 1A.

FIG. 4A is a view showing a configuration of an electric circuit of a disk drive 400, an embodiment of the storage device 101 of FIG. 1A.

As shown in FIG. 4A, the disk drive 400 according to an embodiment of the present invention includes a preamp 410, a read/write channel 420 (R/W CHANNEL), a processor 430, a voice coil motor (VCM) driving unit 440, a spindle motor (SPM) driving unit 450, a ROM 460, a RAM 470 and a host interface 480.

The processor 430 may be implemented as a digital signal processor (DSP), a micro processor, a micro-controller, etc. The processor 430 controls the read/write channel 420 to read or write information from/onto the disk 12 according to a command received from the host device 102 via the host interface 480.

The processor 430 is coupled to the VCM driving unit 440 for supplying a driving current for driving the VCM 30. The processor 430 supplies a control signal to the VCM driving unit 440 so as to control movement of the head 16.

The processor 430 is also coupled to the SPM driving unit 450 for supplying a driving current for driving the spindle motor 14. When power is supplied, the processor 430 supplies a control signal to the SPM driving unit 450 so as to rotate the spindle motor 14 at a target speed.

The processor 430 is coupled to the ROM 460 and the RAM 470, respectively. Firmware and control data for controlling the disk drive are stored in the ROM 460. Program codes and information for executing the read operation controlling method shown in FIGS. 14 to 16 and the write operation controlling method shown in FIGS. 19 and 20 may be stored in the ROM 460. Alternatively, the program codes and information for executing the read operation controlling method shown in FIGS. 14 to 16 and the write operation controlling method shown in FIGS. 19 and 20 may be stored in the maintenance cylinder region of the disk 12, rather than in the ROM 460.

The program codes stored in the ROM 460 or the disk 12 are loaded to the RAM 470 under control of the processor 430. And, data received through the host interface 480 or data read from the disk 12 is temporarily stored in the RAM 470.

The RAM 470 may be implemented as DRAM or SRAM. And, the RAM 470 may be designed to operate in a Single Data Rate (SDR) manner or in a Double Data Rate (DDR) manner.

The processor 430 may control the disk drive to execute the read operation controlling method shown in FIGS. 14 to 16 and the write operation controlling method shown in FIGS. 19 and 20, using the program codes and information stored in the ROM 460 or the maintenance cylinder area of the disk 12.

Figure 4B:
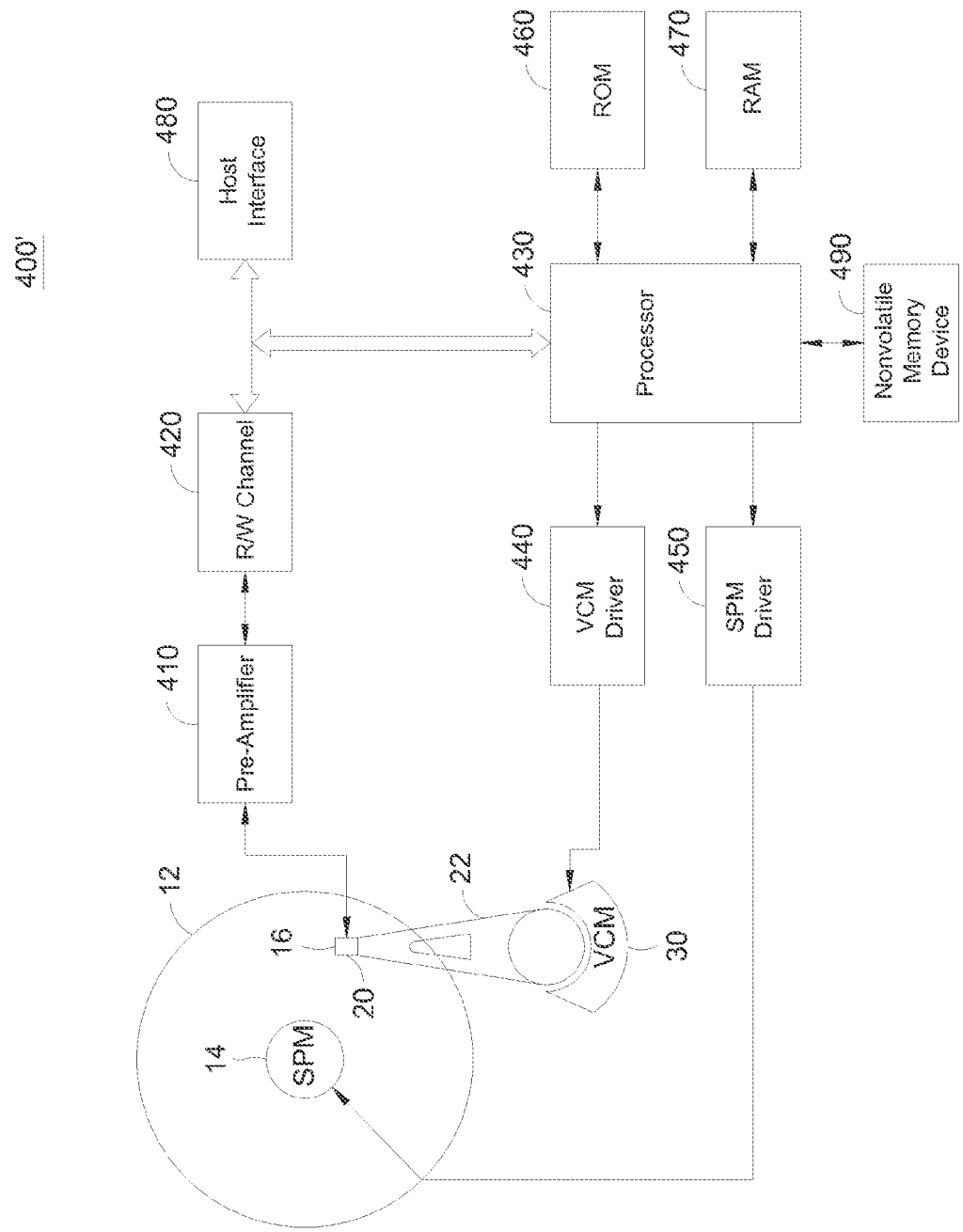
FIG. 4B is a view showing a configuration of electric circuitry of a disk drive, one embodiment of a storage device of FIG. 1B.

FIG. 4B is a view showing a configuration of an electric circuit of a disk drive 400', an embodiment of the storage device 101' of FIG. 1B.

Referring to FIG. 4B, a non-volatile memory device 490 is added to the components of the disk drive 400 of FIG. 4A. Part of data to be stored in the disk drive 400' may be stored in the non-volatile memory device 490. As an example, various types of information required to control the disk drive 400' may be stored in the non-volatile memory device 490.

Program codes and information for executing the read operation controlling method shown in FIGS. 14 to 16 and the write operation controlling method shown in FIGS. 19 and 20 may be stored in the non-volatile memory device 490. And, code objects for performing various functions of the storage device may be stored in the non-volatile memory device 490.

The processor 430 is coupled to the ROM 460, the RAM 470 and the non-volatile memory device 490, respectively. Firmware and control data for controlling the disk drive are stored in the ROM 460. Program codes and information for executing the read operation controlling method shown in FIGS. 14 to 16 and the write operation controlling method shown in FIGS. 19 and 20 may be stored in the ROM 460. Alternatively, the program codes and information for executing the read operation controlling method shown in FIGS. 14 to 16 and the write operation controlling method shown in FIGS. 19 and 20 may be stored in the maintenance cylinder region of the disk 12 or the non-volatile memory device 490, rather than in the ROM 460.

The program codes and data stored in the ROM 460 or the disk 12 or the non-volatile memory device 490 are loaded to the RAM 470 in the initial mode, under control of the processor 430.

Explanations about the aforementioned components of the disk drive 400 of FIG. 4A will be omitted.

Hereinafter, a read operation and a write operation of the disk drive will be explained with reference to FIG. 4A or 4B.

In a data read mode, the preamp 410 amplifies an electric signal sensed by the head 16 from the disk 12. Then, the read/write channel 420 amplifies the signal output from the preamp 410, by an automatic gain control circuit (not shown) for automatically varying a gain according to a signal size. Then, the read/write channel 420 converts the amplified signal into a digital signal and performs decoding, thereby detecting data. The processor 430 corrects the detected data using an error correction code (e.g., Reed-Solomon code). Then, the processor 430 converts the error-corrected detected data into stream data, and transfers the stream data to the host device 102 through the host interface 480.

In a data write mode, the processor 430 receives data from the host device 102 via the host interface 480, and adds, to the received data, an error correction symbol using a Reed-Solomon code. Then, the read/write channel 420 encodes the data to be suitable for a write channel. Then, the preamp 410 records the data onto the disk 12 by the head 16 to which an amplified write current is applied.

Hereinafter, an operation for executing the read operation controlling method shown in FIGS. 14 to 16 and the write operation controlling method shown in FIGS. 19 and 20 by the processor 430, using the program codes and information loaded to the RAM 470 will be explained.

Firstly, will be explained a shingle write method, a new write method proposed to enhance recording density in a disk drive, one of storage devices according to an embodiment of the present invention. The shingle write method indicates a method to consecutively write data in one direction in a state where tracks of a disk overlap each other like tiles.

FIG. 7 is a view showing a storage medium using a shingle write method according to an embodiment of the present invention.

Referring to FIG. 7, the storage medium includes 'X' zones (ZONE 1~ZONE X, here 'X' denotes natural number), and a single zone includes 'Y' bands (BAND 1~BAND Y, here 'Y' denotes natural number). A single band includes a plurality of tracks, and a single track includes a plurality of data sectors (not shown). For instance, in FIG. 7, BAND 1 includes 'Z' tracks ('Z' denotes natural number), and BAND 2 includes 'J' tracks ('J' denotes natural number). Each zone may include the same number of bands or different number of bands. And, each track may include the same number of sectors or different number of sectors.

Data can be consecutively written on a plurality of tracks included in each band (BAND 1~BAND N) in a shingle write manner. For instance, TRACK 2 is overwritten on part of TRACK 1, TRACK 3 is overwritten on part of TRACK 2, and TRACK M is overwritten on part of TRACK M−1. Therefore, the storage medium having the configuration of FIG. 7 can enhance TPI (Track Per Inch), recording density in a radius direction. However, first track of BAND 2 (TRACK M+1) is not overwritten on last track of BAND 1 (TRACK M). In conclusion, the first track of the starting band is not overwritten on the last track of the previous band. Reference numerals 710 and 720 of FIG. 7 denote overwritten regions.

Received data to be written can be consecutively written on tracks of a corresponding band. For instance, firstly-received data for writing on BAND 1 can be written from a first data sector of TRACK 1, and subsequently-received data for writing can be consecutively written from a data sector subsequent to the first data sector. If data is written on all data sectors of a single track, the rest data can be consecutively written from a first data sector of a neighboring track. If a read command is received, a new disk address for Logical Block Address (LBA) of each received data can be dynamically allocated for a read operation.

FIG. 7 illustrates that each track has the same length for convenience. However, in a case where data is written in a concentric manner on a platter of a hard disk, each track has a different length. Therefore, when a storage medium is a disk such as a hard disk, the outer track may include a larger number of sectors than the inner track.

The storage medium of FIG. 7 in which shingle writing can be performed is not limited to a hard disk, but is applicable to any storage medium having tracks.

Figure 8B:
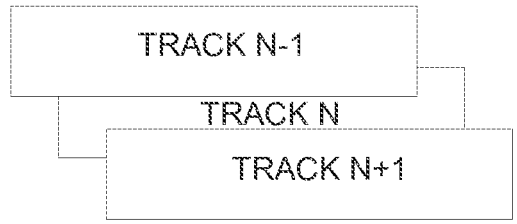

FIGS. 8A and 8B are views for explaining restriction conditions in case of performing data writing using a shingle write method.

Referring to FIG. 8A, in case of performing data writing in the arrow direction using a shingle write method, flux is generated only in the arrow direction. Therefore, a restriction condition that data cannot be written on TRACK N−1 after being written on TRACK N should be satisfied. If data is written on TRACK N−1 after being written on TRACK N in the opposite direction to the shingle write direction, the data written on the TRACK N may be erased due to ATI (Adjacent Track interference).

In order to solve such problem, required is a technique for dynamically allocating a new disk address for LBA provided from a host so as to consecutively perform writing in one of inner and outer circumferential directions of a disk.

Hereinafter, it is assumed that a virtual address is used when converting the LBA to CHS (Cylinder head Sector), PBA (Physical Block Address) of the disk drive. That is, in an embodiment of the present invention, data can be written or stored data can be read by using mapping information between the LBA and the virtual address.

Figure 9:
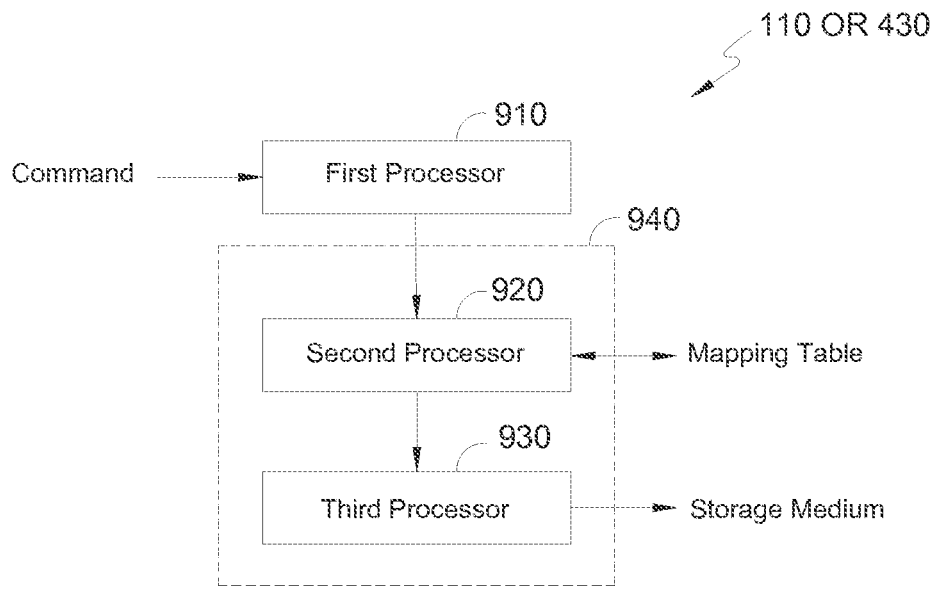
FIG. 9 is a view showing an embodiment of a processor of FIG. 1A or 1B, or a process or FIG. 4A or FIG. 4B.

FIG. 9 is a view showing an embodiment of the processor 110 of FIG. 1A or FIG. 1B, or the processor 430 of FIG. 4A or FIG. 4B.

Figure 10:
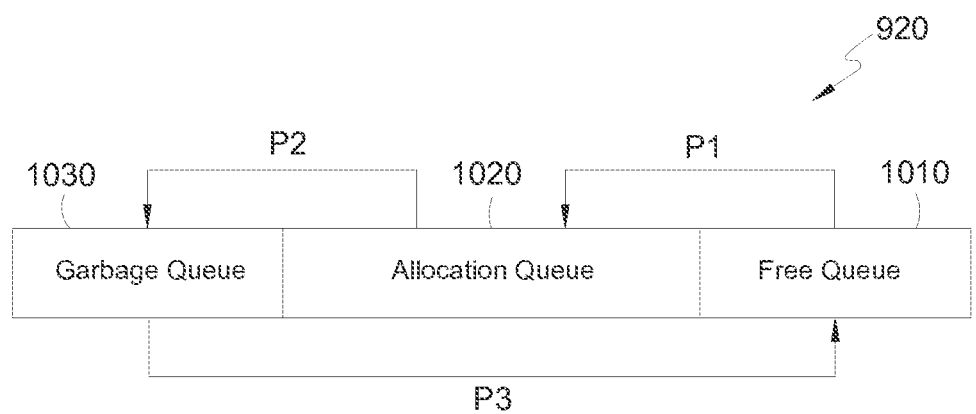
FIG. 10 is a view showing an embodiment of a second processor of FIG. 9.

FIG. 10 is a view showing an embodiment of second processor 920 of FIG. 9.

Referring to FIGS. 1A, 1B, 4A, 4B and 9, the processor 110 or 430 may include first processor 910, second processor 920 and third processor 930. In this case, the second processor 920 and the third processor 930 may be designed to be integrated as a single processor 940. Although not shown, the first processor 910 and the second processor 920 may be also designed to be integrated as a single processor.

The first processor 910 is configured to extract a logical block address designated by a received command.

The second processor 920 is configured to convert the logical block address extracted by the first processor 910 into a virtual address. That is, the second processor 920 can convert the logical block address to the virtual address using a mapping table. The mapping table may include mapping information regarding the logical block address and the virtual address. The mapping table will be explained in more details with reference to FIGS. 11 and 12.

Referring to FIGS. 9 and 10, the second processor 920 may include free queue 1010, allocation queue 1020 and garbage queue 1030. The second processor 920 converts the logical block address designated by the received command into the virtual address, using the free queue 1010, the allocation queue 1020 and the garbage queue 1030.

The second processor 920 stores information regarding virtual bands not allocated to a logical band in the free queue 1010 in a preset order. Here, the virtual bands not allocated to a logical band may indicate virtual bands not including a data sector of valid data. The free queue 1010 is a means where information regarding virtual bands which can be allocated to a logical band according to a command is stored to be selected. In the free queue 1010, information regarding virtual bands which can be allocated to a logical band may be stored in a sorted manner according to each virtual zone or each physical zone.

The second processor 920 stores information regarding virtual bands allocated to a logical band in the allocation queue 1020. For instance, if a virtual band allocated to a logical band including the LBA designated by the received command does not exist in the mapping table, or if all virtual addresses of a virtual band allocated to a logical band including the LBA designated by the received command are used up, the second processor 920 selects one virtual band being in a standby state in the free queue 1010. Then, the second processor 920 allocates the selected virtual band to the logical band including the LBA designated by the received command. and then moves the allocated virtual band to the allocation queue 1020 (P1).

Next, the second processor 920 allocates a corresponding virtual address to the LBA designated by the received command, based on the virtual bands allocated to the logical band stored in the allocation queue 1020. More specifically, the second processor 920 allocates a new virtual band to the logical band including the LBA designated by the received command, and stores the virtual band in the allocation queue 1020. In this case, the second processor 920 allocates a virtual address corresponding to first data sector of the virtual band, to the LBA designated by the received command.

If the virtual band already-allocated to the logical band including the LBA designated by the received command exists in the allocation queue 1020, the second processor 920 allocates a virtual address not allocated in the corresponding virtual band, to the LBA designated by the received command. For instance, the second processor 920 may allocate a virtual address with respect to a data sector subsequent to the lastly-accessed data sector, in the virtual band already-allocated to the logical band including the logical block address, to the LBA designated by the received command.

The second processor 920 selects virtual band having virtual addresses invalidated due to data update and having the number exceeding a threshold value, from virtual bands allocated to logical band. Then, the second processor 920 moves the selected virtual band to the garbage queue 1030 (P2).

If the number of virtual bands stored in the free queue 1010 is less than an initially-set minimum value, the second processor 920 performs a garbage collection process. That is, the second processor 920 reads data stored in sectors of valid virtual addresses, from virtual bands stored in the garbage queue 1030. Then, the second processor 920 rewrites the read data in the free queue 1010 on a virtual address designated by a newly-allocated virtual band.

The second processor 920 moves information regarding the virtual band on which rewriting has been performed, to the free queue 1010, the virtual band selected from virtual bands stored in the garbage queue 1030 (P3). In this case, the virtual band on which rewriting has been performed has no valid data any longer, and data stored in the virtual band is invalid data.

The third processor 930 converts the virtual address converted by the second processor 920 into physical block address of the disk, and controls the storage device to access a storage medium based on the physical block address. That is, the third processor 920 converts virtual address into CHS (Cylinder Head Sector) information indicating a physical position of the disk. Then, the third processor 920 generates a voice coil motor (VCM) driving control signal for accessing the disk, based on the CHS information.

Referring to FIG. 4A or 4B, once a VCM driving control signal generated by the third processor 930 is applied to the VCM driving unit 440, the VCM driving unit 440 generates VCM driving current corresponding to the VCM driving control signal, and supplies the current to the VCM 30. Then, the head 16 moves to a desired track of the disk to be accessed, and performs data writing or data reading in correspondence to a command.

FIG. 11 is a block diagram of a storage device 1100 according to an embodiment of the present invention.

Referring to FIG. 11, the storage device 1100 may include a processor 1110, an information storage unit 1120, a storage medium interface 1130 and a storage medium 1140.

The processor 1110 of FIG. 11 may be the processor 110 of FIG. 1A or FIG. 1B, or may be the processor 430 of FIG. 4A or FIG. 4B. The processor 1110 may include counter 1111, comparator 1112, mapping information management unit 1113, defect management unit 1114, and read/write controller 1115.

In case of performing a read retry operation due to error occurring while the storage medium 1140 performs a read operation, the counter 1111 may count the number of times (frequency) of the read retry operation. Alternatively, in case of performing a write retry operation due to error occurring while the storage medium 1140 performs a write operation, the counter 1111 may count the number of times (frequency) of the write retry operation.

The comparator 1112 may compare the output value (RETC) from the counter 1111 with a threshold value. For instance, the comparator 1112 may compare the read retry frequency counted by the counter 1111 with a threshold value, or may compare the write retry frequency counted by the counter 1111 with a threshold value. The threshold value will be explained in more details with reference to FIGS. 14 to 22.

A comparison result (COMP) of the comparator 1112 may be transferred to at least one of the mapping information management unit 1113, the defect management unit 1114 and the read/write controller 1115.

The mapping information management unit 1113 may generate mapping information (MAP) in response to the comparison result (COMP) thus to store the generated MAP in mapping table 1121, or may update the existing mapping information stored in the mapping table 1121 into new mapping information (MAP).

The defect management unit 1114 may store, in a test list 1122, information (TE) regarding at least one data sector to be tested whether it is defective or not, according to the comparison result (COMP). Also, the detect management unit 1114 may determine whether a data sector corresponding to the information (TE) is defective or not, based on the information (TE) stored in the test list 1122, and may store information (DE) of the data sector determined as a defective data sector in a defect list 1123.

The read/write controller 1115 may generate a control signal (CON) for controlling a read operation or a write operation in response to the comparison result (COMP), and may output the control signal to the storage medium interface 1130. The storage medium interface 1130 may perform a read operation or a write operation in the storage medium 1140 in response to the control signal (CON).

The information storage unit 1120 may store therein at least one of the mapping table 1121, the test list 1122 and the defect list 1123. As aforementioned, at least one of the mapping table 1121, the test list 1122 and the defect list 1123 may be stored in the RAM 130 (FIG. 1A or 1B) or in the RAM 470 (FIG. 4A or 4B), or may be stored in the storage medium 150 (FIG. 1A or 1B) or in the disk 12 (FIG. 4A or 4B). Alternatively, at least one of the mapping table 1121, the test list 1122 and the defect list 1123 may be stored in an additional memory.

The storage medium interface 1130 may perform a read operation or a write operation in the storage medium 1140, in response to the control signal (CON) received from the read/write controller 1115. The storage medium 1140 may store data, or may perform data writing using a shingle write method. That is, the storage medium 1140 may include a plurality of tracks where data is stored, and the tracks may be included in at least one virtual band. Each track may partially overlap a neighboring track.

In a case where the storage device 1100 of FIG. 11 is implemented as the hard disk drive 400 of FIG. 4A or 4B, the processor 1110 may correspond to the processor 430, and the information storage unit 1120 may be included in the disk 12 or the ROM 460. The storage medium interface 1130 may correspond to a device configured to control a read operation or a data writing operation and including the head 16. And, the storage medium 1140 may correspond to the disk 12.

Operations of the components of the storage device 1100 of FIG. 11 will be explained in more details with reference to FIGS. 14 to 22.

FIG. 12 is a view showing an embodiment of mapping information 1200 stored in the mapping table 1121 of FIG. 11.

The mapping information 1200 stored in the mapping table 1121 is information indicating a relation between a logical block address designated by a received command and a virtual address. That is, a storage position of data corresponding to the logical block address can be searched based on the mapping information 1200.

Referring to FIG. 12, the mapping information 1200 may include logical block address (LBA), virtual address (VA), the number of data sectors where valid data is sequentially stored (SC) and band number (BN). For instance, when the mapping information 1200 is "1231", data corresponding to LBA "1" is stored in data sector corresponding to VA "2" of BN "1". Since the number of data sectors where valid data is sequentially stored (SC) is "3", 3 data starting from data corresponding to LBA "1" is sequentially stored in 3 data sectors starting from data sector corresponding to VA "2" of BN "1". For instance, data corresponding to LBA "1", "2" and "3" is stored in VA "2", "3" and "4" of BN "1", respectively.

In the present invention, it is assumed that the mapping information 1200 includes information of FIG. 12. However, the present invention is not limited to this. That is, the mapping information 1200 may be set to have another information rather than the information of FIG. 12, as long as it can indicate a relation between the logical block address designated by the received command and the virtual address. For instance, the mapping information 1200 may be set based on at least one of a number of data sector where data is lastly written, valid band, valid track, valid sector, the number of invalid sectors per band, the number of active bands, active sector, active track and active band. The valid band, the valid track, and the valid sector may indicate band, track and sector each capable of writing valid data, respectively. And, the active sector, the active track and the active band may indicate sector, track and band each having valid data written thereon, respectively.

Figure 13A:
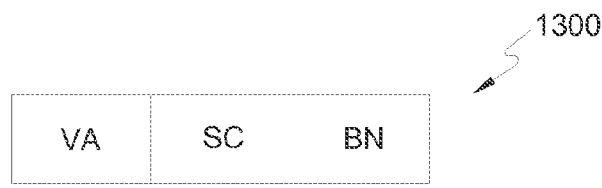
FIG. 13A is a view showing an embodiment of information stored in a test list or information stored in a defect list.

FIG. 13A is a view showing an embodiment of information (TE) stored in the test list 1122 or information (DE) stored in the defect list 1123. And, FIG. 13B is a view showing another embodiment of the information (TE) stored in the test list 1122 or the information (DE) stored in the defect list 1123.

Referring to FIGS. 12 and 13A, the information (TE) stored in the test list 1122 or the information (DE) stored in the defect list 1123 may include information 1300 excluding the LBA from the mapping information 1200 of FIG. 12. Alternatively, the information (TE) stored in the test list 1122 may include information 1300 excluding the LBA and SC (the number of data sectors to be sequentially tested) from the mapping information 1200 of FIG. 12. Still alternatively, the information (DE) stored in the defect list 1123 may include information 1350 excluding the LBA and SC (the number of data sectors sequentially arranged and having defects thereon) from the mapping information 1200 of FIG. 12.

Figure 13B:
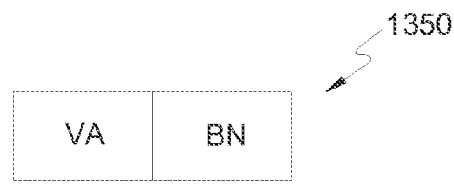
FIG. 13B is a view showing another embodiment of information stored in a test list or information stored in a defect list.

More specifically, the information (TE) stored in the test list 1122 or the information (DE) stored in the defect list 1123 may be the same as the mapping information 1200 of FIG. 12, or may not be the same as the mapping information 1200 of FIG. 12 as shown in FIG. 13A or 13B. The information (TE) stored in the test list 1122 or the information (DE) stored in the defect list 1123 is not limited to a specific TE or DE shown in FIGS. 12, 13A and 13B. The information (TE) stored in the test list 1122 or the information (DE) stored in the defect list 1123 may be set by using another information, as long as it can indicate information for testing whether defect has occurred or not, or information for specifying any data sector having defect.

FIG. 14 is a flowchart showing a method for controlling a read operation according to an embodiment of the present invention.

Referring to FIGS. 11 to 14, if a read command is received, the read/write controller 1115 may generate a control signal (CON) for performing a read operation at a first area of the storage medium 1140 where data corresponding to the read command has been stored, and may output the generated control signal to the storage medium interface 1130. The storage medium interface 1130 may perform a read operation at the first area of the storage medium 1140 in response to the received control signal (CON). Hereinafter, it is assumed that the read command includes an address of data to be read. That is, the received read command is a command instructing reading of data stored in at least one data sector corresponding to the address included in the read command.

If an error occurs while the read operation is performed at the first area of the storage medium 1140, an read retry operation for performing the read operation again may be performed (S1410). In this case, the counter 1111 may count the number of times (frequency) of the read retry operation. The comparator 1112 may determine whether the frequency counted by the counter 1111 is equal to or more than 'n' ('n' is natural number). The 'n' may be determined with consideration of the number of entire data sectors, time duration for which the entire data sectors can be read, and a probability of the occurrence of a read error. However, the 'n' may be determined with consideration of other information if necessary. As a comparison result by the comparator 1112, if it is determined that the number of times of the read retry operation is equal to or more than the 'n' and the storage medium interface 1130 has normally read data at the first area, the read/write controller 1115 may generate a control signal (CON) for writing the read data to a second area of the storage medium 1140. Then, the read/write controller 1115 may output the generated control signal (CON) to the storage medium interface 1130. Then, the storage medium interface 1130 may write the read data on the second area of the storage medium 1140 in response to the received control signal (CON) (S1420).

If it is determined that the read retry operation has been performed the 'n' times or more than but the storage medium interface 1130 has abnormally read data at the first area, the comparator 1112 determines whether the number of times of the read retry operation is 'm' ('m' is natural number more than the 'n') (S1430). The 'm' may be determined with consideration of a maximum number of times of the read retry operation. However, the 'm' may be determined with consideration of other information if necessary. If the number of times of the read retry operation is less than the 'm', the read retry operation is continuously performed. However, if the read retry operation has been performed the 'm' times but the storage medium interface 1130 has abnormally read data at the first area, the defect management unit 1114 may determine whether at least one data sector included in the first area is defective or not (S1440). The method for determining whether any defect has occurred or not will be explained in more details with reference to FIG. 16.

In case of writing the read data on the second area in S1420, the mapping information management unit 1113 may change mapping information regarding the read data, and store the changed mapping information in the mapping table 1121. Therefore, if the read command is received again, the read/write controller 1115 may generate a control signal (CON) for reading data at the second area rather than at the first area, and may output the generated control signal (CON) to the storage medium interface 1130. The storage medium interface 1130 may perform a read operation at the second area of the storage medium 1140 in response to the received control signal (CON) (S1450). In case of performing S1450, the storage device 1100 may perform the process again in S1410.

The first area may include at least one data sector among a plurality of data sectors included in a virtual band. A virtual address of at least one data sector of the first area may correspond to a logical block address designated by the received read command. The second area may include at least one data sector on which the read data can be consecutively written, the at least one data sector selected from data sectors of one virtual band including the first area or another virtual band not including the first area. For instance, the second area may include at least one data sector of the one virtual band or the another virtual band, on which the read data can be consecutively written and ATI (Adjacent Track Interference) does not occur. Here, the at least one data sector is adjacent to the last data sector where data has been stored. If the another virtual band is in a free band state where valid data has not been stored, the second area may include at least one data sector of the virtual band which is in a free band state. In this case, the read data may be consecutively written on data sectors of the virtual band which is in a free band state, starting from the first data sector. Embodiments of the first area or the second area will be explained in more details with reference to FIGS. 18A to 18G.

Hereinafter, the method for controlling a read operation of FIG. 14 will be explained in more details with reference to FIG. 15.

FIG. 15 is a flowchart showing the method for controlling a read operation of FIG. 14 in more details.

Referring to FIGS. 11 to 15, if a read command is received (S1510), the read/write controller 1115 may generate a control signal (CON) for performing a read operation at the first area of the storage medium 1140, and may output the generated control signal to the storage medium interface 1130. The storage medium interface 1130 may perform a read operation at the first area in response to the received control signal (CON) (S1520). If an error occurs while the storage medium interface 1130 performs a read operation at the first area, an read retry operation for performing the read operation again may be performed at the first area (S1530). In this case, the counter 1111 may count the number of times (frequency) of the read retry operation. And, the comparator 1112 may compare the read retry frequency counted by the counter 1111 with the 'n' (S1540). As a comparison result in S1540, if it is determined that the read retry operation has been performed the 'n' times or more than, the read/write controller 1115 determines whether the storage medium interface 1130 has completed the read operation at the first area of the storage medium 1140 (S1550).

As a determination result in S1550, if the read operation has been completed at the first area, the read/write controller 1115 may generate a control signal (CON) for writing the read data on the second area of the storage medium 1140. Then, the read/write controller 1115 may output the generated control signal (CON) to the storage medium interface 1130. Then, the storage medium interface 1130 may write the data read at the first area on the second area in response to the received control signal (CON) (S1560). The mapping information management unit 1113 may generate mapping information (MAP) between the read data and at least one data sector of the second area, thereby changing the existing mapping information regarding the mapping table 1121 (S1570). That is, the mapping information management unit 1113 may delete mapping information between the first area and the read data, and may store mapping information between the read data and the second area in the mapping table 1121. For instance, the mapping information management unit 1113 may delete, from the mapping table 1121, mapping information between at least one LBA corresponding to the read data and at least one virtual address corresponding to the first area. And, the mapping information management unit 1113 may generate mapping information between at least one LBA corresponding to the read data and at least one virtual address corresponding to the second area, and may store the generated mapping information in the mapping table 1121. Accordingly, if the read command is received again after S1570, the read/write controller 1115 generates a control signal (CON) for performing a read operation at the second area rather than at the first area, using the mapping information stored in the mapping table 1121. Then, the read/write controller 1115 outputs the generated control signal (CON) to the storage medium interface 1130.

If the number of times of the read retry operation is equal to or more than the 'n' in S1540, and if the read operation has not been completed in S1550, the comparator determines whether the number of times of the read retry operation is the 'm' (S1580). If the number of times of the read retry operation is less than the 'm', the storage device 1100 returns to S1520. In a case where the number of times of the read retry operation is the 'm' in S1580 and S1560 has been performed, if the virtual band including the first area is changed to a free band including no valid data, the defect management unit 1114 may determine whether at least one data sector including the first area is defective or not (S1590). S1590 will be explained in more details with reference to FIG. 16.

If the number of times of the read retry operation is less than the 'n' in S1540, it is determined whether the read operation has been completed at the first area (S1595). If it is determined in S1595 that the read operation has not been completed, the process returns to S1520. On the other hand, if it is determined in S1595 that the read operation has been completed, the read operation is terminated.

Furthermore, in a case where a virtual band including the first area is changed to a free band including no valid data, the defect management unit 1114 may test whether a read operation is normally performed on at least one servo area included in the virtual band. If it is determined as a test result that data is not normally read at the servo area, the defect management unit 1114 may store, in the defect list 1123, information regarding data sectors corresponding to the at least one servo area where data is not normally read. The data sector corresponding to the information stored in the defect list 1123 cannot undergo a write operation in response to a write command, even if does not include valid data stored therein. That is, the data sector corresponding to the information stored in the defect list 1123 is not used later.

FIG. 16 is a flowchart showing S1440 of FIG. 14 or S1590 of FIG. 15 in more details.

Referring to FIGS. 14 to 16, the defect management unit 1114 may store, in the test list 1122, information regarding at least one data sector included in the first area (S1610). If the virtual band including the first area is changed into the free band (S1620), the defect management unit 1114 may test, based on a test pattern, whether at least one data sector included in the first area (S1630) is defective or not. For instance, the defect management unit 1114 may transmit, to the read/write controller 1115, a signal for testing whether at least one data sector included in the first area is defective or not. The read/write controller 1115 may output, to the storage medium interface 1130, a control signal (CON) for writing the test pattern on at least one data sector included in the first area, in response to the signal received from the defect management unit 1114. The storage medium interface 1130 may write the test pattern on at least one data sector included in the first area, in response to the received control signal (CON). Then, the read/write controller 1115 may output, to the storage medium interface 1130, a control signal (CON) for reading the test pattern stored in at least one data sector included in the first area. The storage medium interface 1130 may read the test pattern from at least one data sector included in the first area, in response to the received control signal (CON). The defect management unit 1114 determines at least one data sector from which the test pattern has not been read, or at least one data sector of which read test pattern is not identical to the written test pattern, as a defective data sector. And, the defect management unit 1114 may store information regarding the at least one defective data sector in the defect list 1123 (S1640). As aforementioned, data sector corresponding to the information stored in the defect list 1123 is not used later. Therefore, the data sector corresponding to the information stored in the defect list 1123 cannot undergo a write operation even if a write command is applied.

Figure 17A:
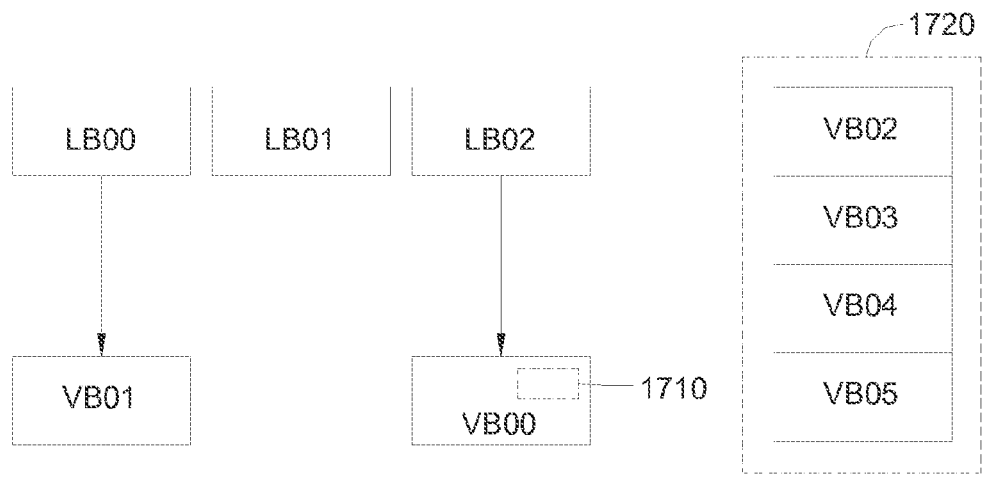
FIGS. 17A to 17C are views showing an embodiment of the method for controlling a read operation of FIGS. 14 to 16.
Figure 17B:
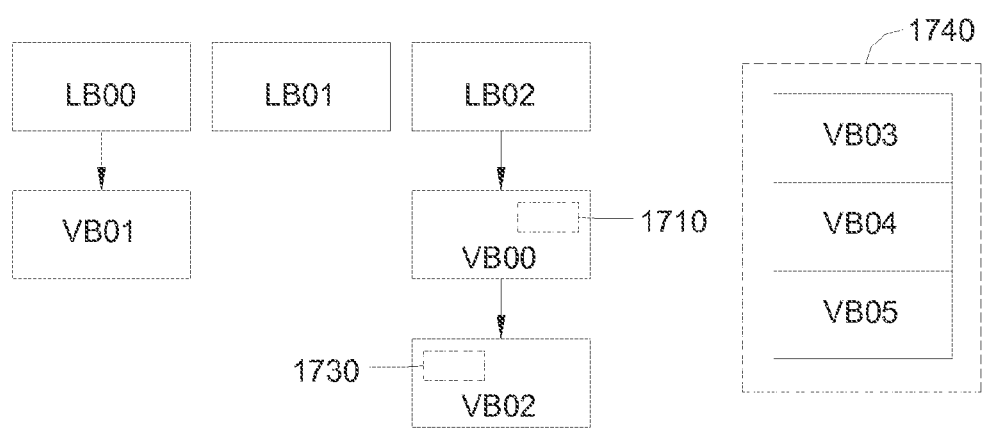
Figure 17C:
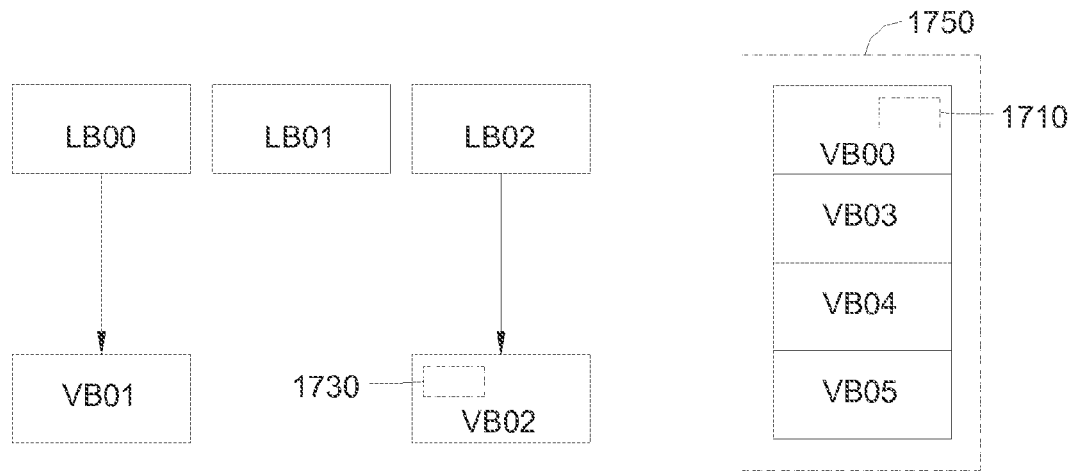

FIGS. 17A to 17C are views showing an embodiment of the method for controlling a read operation of FIGS. 14 to 16. Hereinafter, the method for controlling a read operation according to an embodiment of the present invention will be explained with reference to FIGS. 11 to 17C.

Referring to FIG. 17A, reference numeral 1710 of virtual band (VB00) denotes the first area. Logical band (LB00) is mapped onto virtual band (VB01), and logical band (LB02) is mapped onto virtual band (VB00). Reference numeral 1720 denotes the free bands. That is, each virtual band (VB02, VB03, VB04 and VB05) denotes the free band.

As aforementioned with reference to FIGS. 14 to 16, if the number of times of the read retry operation is equal to or more than the 'n', and if data has been normally read at the first area 1710, the read/write controller 1115 may output a control signal (CON) for writing the read data on the second area 1730, to the storage medium interface 1130. The storage medium interface 1130 may write data on the second area 1730 in response to the received control signal (CON), and the mapping information management unit 1113 may change mapping information regarding the read data. Subsequently, invalid data is later stored in the first area 1710 of the virtual band (VB00).

FIG. 17B illustrates a case that the read data is written on the second area 1730 of the virtual band (VB02) different from the virtual band (VB00) including the first area 1710. However, the present invention is not limited to this. More specifically, the read data may be written on second area of the virtual band (VB00) including the first area 1710, the second area where valid data has not been stored. Since the read data has been written on the second area of the virtual band (VB02) in FIG. 17B, only the virtual bands VB03, VB04 and VB05 are in a free band state.

FIG. 17C illustrates a case that the virtual band (VB00) of FIG. 17B is changed to a free band. In this case, the defect management unit 1114 may determine whether the first area 1710 of the virtual band (VB00) is defective or not as aforementioned with reference to FIG. 16.

Figure 17D:
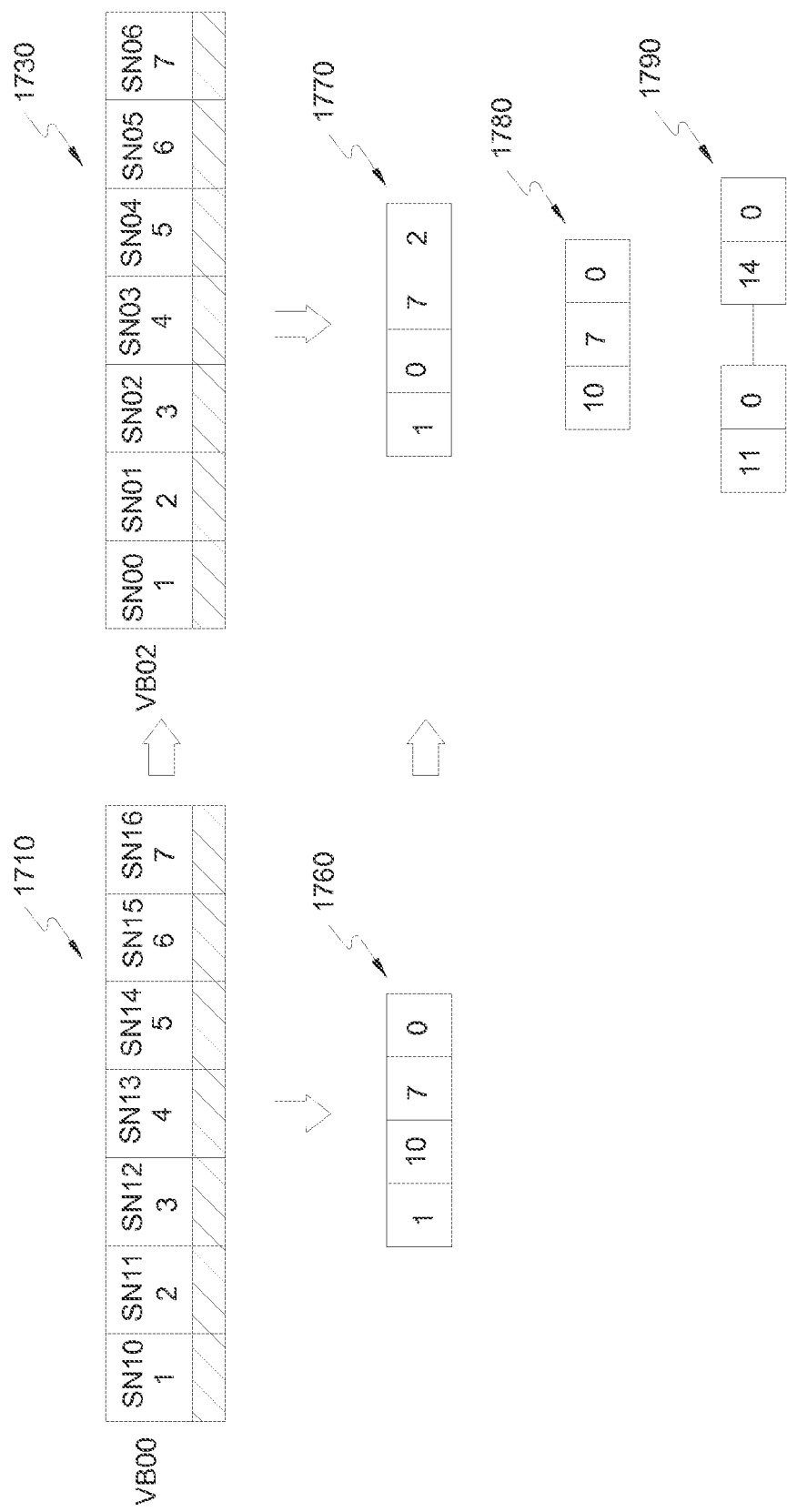
FIG. 17D is a view for explaining the mapping table, the test list and the defect list of FIG. 11 in more details.

FIG. 17D is a view for explaining the mapping table 1121, the test list 1122 and the defect list 1123 of FIG. 11 in more details.

Referring to FIGS. 11 to 17D, it is assumed that the first area 1710 of the virtual band (VB00) includes 7 data sectors (SN10~SN16). However, the first area 1710 of the present invention is not limited to this. That is, the first area 1710 may include any number of data sectors. Logical block addresses (1~7) correspond to virtual addresses (10~16), respectively. For convenience, it is assumed that the mapping information 1200 of FIG. 12 is stored in the mapping table 1121. However, the present invention is not limited to this. That is, other types of mapping information may be stored in the mapping table 1121.

Referring to FIG. 17A, mapping information 1760 on the first area 1710 is stored in the mapping table 1121. That is, the mapping information 1760 indicates that 7 data starting from data corresponding to LBA "1" is sequentially stored in 7 data sectors starting from data sector corresponding to VA "10" of the VB00.

Referring to FIG. 17B, if the read data is written on the second area 1730 of the virtual band (VB02) different from the VB00 including the first area 1710, the mapping information management unit 1113 may delete the mapping information 1760 regarding the first area 1710 and stored in the mapping table 1121, and may store mapping information 1770 regarding the second area 1730. That is, the mapping information management unit 1113 may generate mapping information 1770 and store the mapping information 1770 in the mapping table 1121. Here, the mapping information 1770 indicates that 7 data starting from data corresponding to LBA "1" is sequentially stored in 7 data sectors starting from data sector corresponding to VA "0" of the VB02.

Referring to FIG. 17C, the defect management unit 1114 may store information 1780 in the test list 1122, before determining whether the first area 1710 of the virtual band (VB00) is defective or not as aforementioned with reference to FIG. 16. That is, the defect management unit 1114 may generate mapping information 1780 and store the mapping information 1780 in the test list 1122. Here, the mapping information 1780 indicates that 7 data sectors starting from data sector corresponding to VA "10" of the VB00 are to be sequentially tested whether they are defective or not.

Referring to FIG. 17C, the defect management unit 1114 may store information 1790 in the defect list 1123, after determining whether the first area 1710 of the virtual band (VB00) is defective or not, as aforementioned with reference to FIG. 16. That is, the defect management unit 1114 may store mapping information 1790 in the defect list 1123. Here, the mapping information 1790 indicates that a data sector corresponding to VA "11" of the VB00, and a data sector corresponding to VA "14" of the VB00 have been determined as defective data sectors.

For convenience, it is assumed that the information of FIG. 13A is stored in the test list 1122, and the information of FIG. 13B is stored in the defect list 1123. However, the present invention is not limited to this. That is, other types of information may be stored in the test list 1122 and the defect list 1123.

FIGS. 18A to 18D are views for explaining data read while performing the method for controlling a read operation of FIGS. 14 to 16, and FIGS. 18B, 18C, 18E, 18F and 18G are views for explaining data written while performing the method for controlling a read operation of FIGS. 14 to 16.

Figure 18A:
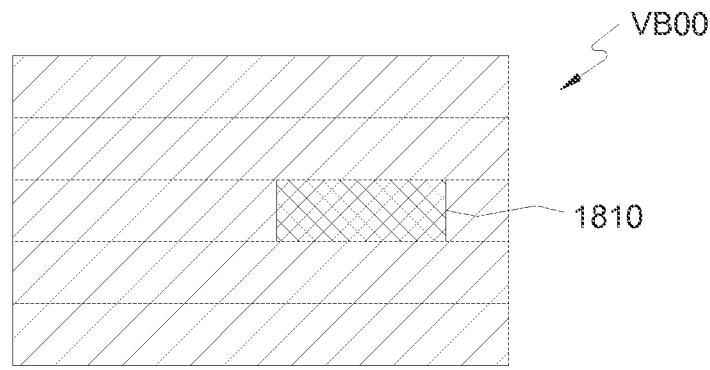
FIGS. 18A and 18D are views for explaining data read while performing the method for controlling the read operation of FIGS. 14 to 16.

FIG. 18A illustrates first area 1810 of virtual band (VB00), the first area 1810 where data reading is performed. FIG. 18A illustrates a case that data has been recorded on all tracks of the virtual band (VB00), and data of the first area 1810 has been read. Referring to FIG. 18A, 5 tracks are included in a single virtual band (VB00). However, the present invention is not limited to this. That is, a single virtual band may include any number of tracks. It is assumed that data was read from the first area 1810 of FIG. 18A, after a read retry operation had been performed 'n' times or more than while the method for controlling a read operation of FIG. 14 or FIG. 15 was performed.

Figure 18B:
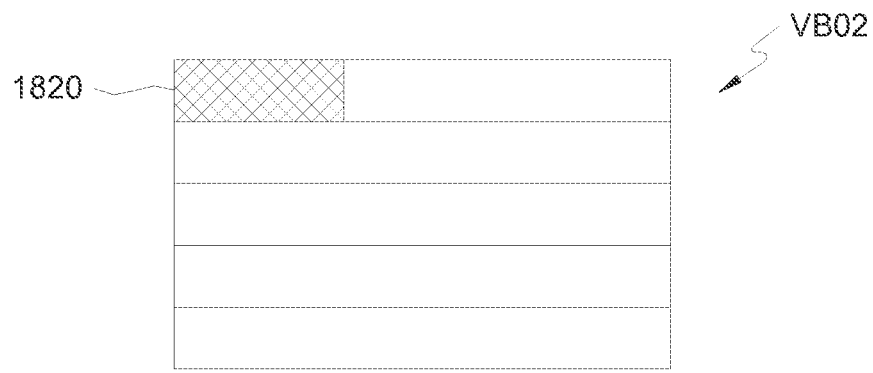
FIGS. 18B, 18C, 18E, 18F, and 18G are views for explaining data written while performing the method for controlling the read operation of FIGS. 14 to 16.
Figure 18C:
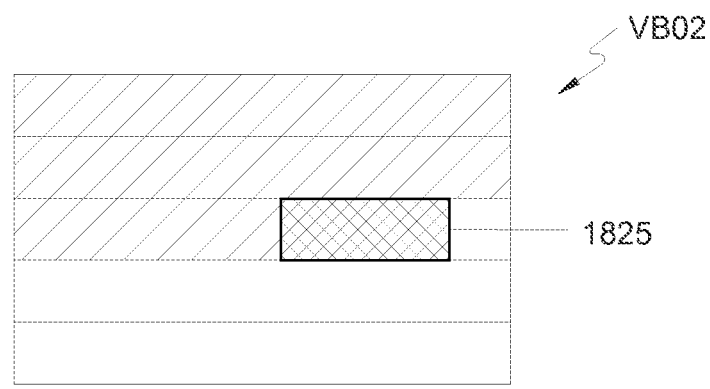

FIGS. 18B and 18C illustrate second area 1820 or 1825 on which the data read from the first area 1810 is written. Referring to FIG. 18B, the second area 1820 may include at least one data sector of virtual band (VB02) which is in a free band state where valid data has not been stored. Referring to FIG. 18C, the second area 1825 may include at least one data sector adjacent to last data sector of another virtual band (VB02) not including the first area, the last data sector where data has been stored. Even if a write operation is performed in a shingle write manner with respect to the second area 1825, one of tracks of the virtual band (VB02) of FIG. 18C, ATI does not occur since no data has been stored in neighboring tracks below the second area 1825. More specifically, the second area 1825 may include at least one data sector on which data read at the first area 1810 can be consecutively written, and the at least one data sector having no ATI during a write operation.

Figure 18D:
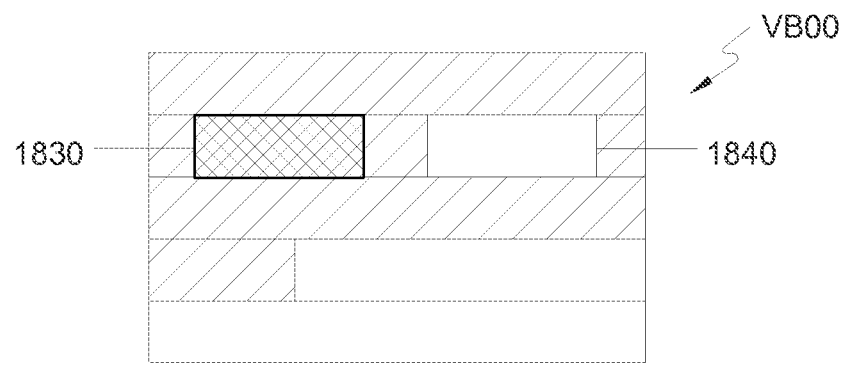

FIG. 18D illustrates first area 1830 of virtual band (VB00) where data reading is performed. FIG. 18D illustrates a case that data has been recorded only part of tracks of the virtual band (VB00), and a data read operation is performed on the first area 1830 of the virtual band (VB00). In the virtual band (VB00), no data has been stored in areas including 1840 having no marks thereon. FIG. 18D illustrates a case that 5 tracks are included in a single virtual band (VB00). However, the present invention is not limited to this. That is, a single virtual band may include other number of tracks. It is assumed that data was read from the first area 1830 of FIG. 18D, after a read retry operation had been performed 'n' times or more than while the method for controlling a read operation of FIG. 14 or FIG. 15 was performed.

Figure 18E:
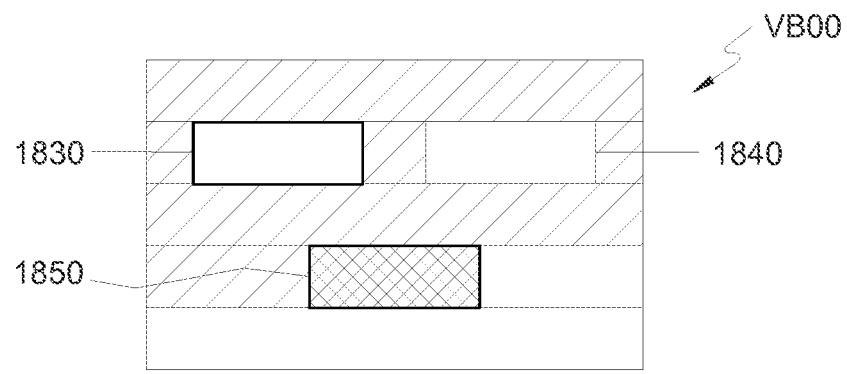
Figure 18F:
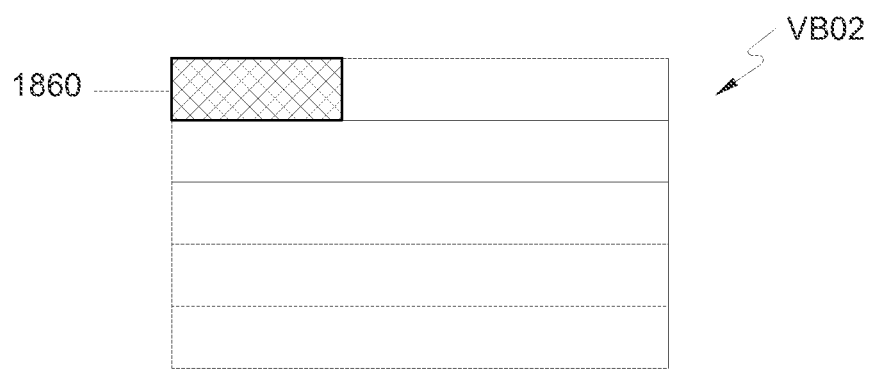
Figure 18G:
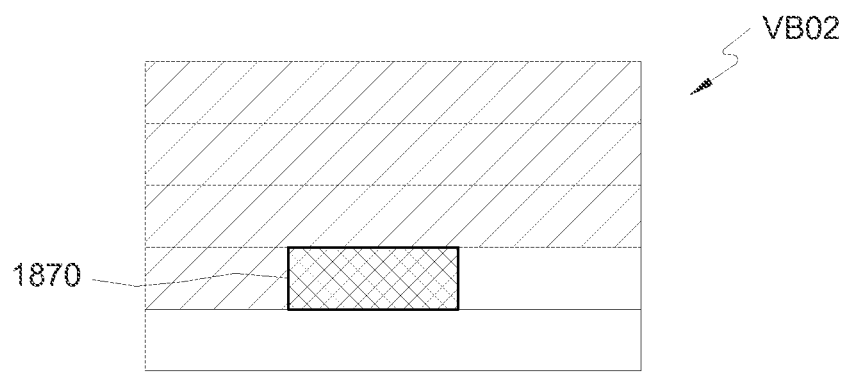

FIGS. 18E to 18G illustrate second area 1850, 1860 or 1870 on which data read from the first area 1830 is written. Referring to FIG. 18E, the second area 1850 may include at least one data sector adjacent to last data sector of another virtual band (VB00) including the first area, the last data sector where data has been stored. Even if a write operation is performed in a shingle write manner on the second area 1850, one of tracks of the virtual band (VB00) of FIG. 18D, ATI does not occur since no data has been stored in neighboring tracks below the second area 1850. However, if a write operation is performed in a shingle write manner on the area 1840, ATI may occur since data has been stored in neighboring tracks below the area 1840. Accordingly, in an embodiment of the present invention, the area 1840 is not determined as the second area, but the area 1850 is determined as the second area. More specifically, the second area 1850 may include at least one data sector on which data read at the first area 1830 can be consecutively written, and the at least one data sector having no ATI during a write operation.

Referring to FIG. 18F, the second area 1860 may include at least one data sector of virtual band (VB02) which is in a free band state where valid data has not been stored. Referring to FIG. 18G, the second area 1870 may include at least one data sector adjacent to last data sector of another virtual band (VB02) not including the first area, the last data sector where data has been stored. Even if a write operation is performed in a shingle write manner with respect to the second area 1870, one of tracks of the virtual band (VB02) of FIG. 18G, ATI does not occur since no data has been stored in neighboring tracks below the second area 1870. More specifically, the second area 1870 may include at least one data sector on which data read at the first area 1830 can be consecutively written, and the at least one data sector having no ATI during a write operation.

In the present invention, each of the virtual bands needs not be provided with an additional spare data sector for storing data read from an error-occurred data sector. That is, in an embodiment of the present invention, each track may be provided with no additional spare data sector, and data read from the first area may be written on at least one data sector among data sectors on which data is consecutively written in an applied order.

FIG. 19 is a flowchart showing a method for controlling a write operation according to an embodiment of the present invention.

Referring to FIGS. 11 to 13B and FIG. 19, if a write command is received (S1910), the read/write controller 1115 may generate a control signal (CON) for performing a write operation on data sectors of the storage medium 1140, the data sectors where valid data has not been stored. Then, the read/write controller 1115 may output the generated control signal to the storage medium interface 1130. The storage medium interface 1130 may write data on the data sectors in response to the received control signal (CON) (S1920). If an error occurs while the storage medium interface 1130 performs the write operation, a write retry operation for performing the write operation again may be performed (S1930). In this case, the counter 1111 may count the number of times (frequency) of the write retry operation. The comparator 1112 may compare the write retry frequency counted by the counter 1111 with 'k' (S1940). Here, the 'k' may be determined with consideration of Track Per Inch (TPI).

If it is determined in S1940 that there is a first data sector on which the write retry operation has been performed 'k' times, the second data including first data to be written on the data sectors starting from the first data sector, is written on the data sectors starting from second data sector (S1950). The second data sector may be a data sector subsequent to the first data sector, and having no valid data stored therein. For instance, the second data sector may be a data sector adjacent to the first data sector in a direction to write data in response to the write command, and having no valid data stored therein. However, the present invention is not limited to this. That is, the second data sector may be any data sector rather than the first sector, among the data sectors where valid data has not been stored. For instance, if a last data sector of a virtual band including a plurality of data sectors is the first data sector, the second data may be written on data sectors of another virtual band starting from a second data sector, the data sectors of another virtual band where valid data has not been stored.

The second data may include only the first data. Alternatively, the second data may include the first data, and third data written on at least one third data sector positioned before the first data sector. That is, the second data may be data written on at least one third data sector positioned between the first data sector and data sector positioned before the first data sector by a preset number. For instance, the third data may be data written on at least one third data sector positioned between a servo area where servo information regarding the first data sector has been stored and the first data sector.

The mapping information management unit 1113 may generate mapping information (MAP) of data corresponding to the write command (S1960). For instance, the mapping information management unit 1113 may store, in the mapping table 1121, mapping information (MAP) between at least one LBA of data corresponding to the write command, and virtual address of at least one data sector on which data corresponding to the write command has been written. Accordingly, if a read command for reading the data corresponding to the write command is received after S1960, the read/write controller 1115 generates a control signal (CON) for performing a read operation using the mapping information stored in the mapping table 1121. Then, the read/write controller 1115 outputs the generated control signal (CON) to the storage medium interface 1130.

If the virtual band including at least one data sector to be determined whether it is defective or not is changed to a free band including no valid data, the defect management unit 1114 may determine whether the at least one data sector is defective or not (S1970). For instance, if the second data includes only the first data, the at least one data sector to be determined whether it is defective or not may be the first data sector. If the second data includes the first data, and third data written on at least one third data sector positioned before the first data sector, the at least one data sector to be determined whether it is defective or not may include the first data sector and the at least one third data sector. S1970 will be explained in more details with reference to FIG. 20.

If it is determined in S1940 that a first data sector on which the write retry operation has been performed 'k' times does not exist, the read/write controller 1115 determines whether the storage medium interface 1130 has completed the write operation of the storage medium 1140 (S1980). If the write operation has not been completed as a determination result in S1980, the process returns to S1920. On the other hand, if the write operation has been completed as a determination result in S1980, the write operation is terminated.

Furthermore, in a case where a virtual band including the first data sector is changed to a free band including no valid data, the defect management unit 1114 may test whether a read operation is normally performed on at least one servo area included in the virtual band. If it is determined as a test result that data has not been normally read at the servo area, the defect management unit 1114 may store, in the defect list 1123, information regarding data sectors corresponding to the at least one servo area where data has not been normally read. The data sector corresponding to the information stored in the defect list 1123 cannot undergo a write operation in response to a write command, even if valid data has not been stored therein. That is, the data sector corresponding to the information stored in the defect list 1123 is not used later.

A Position Error Signal (PES) may be measured to be compared with a reference value. If the PES is more than the reference value as a comparison result, a preset time is lapsed for waiting since a write error may have occurred due to temporary external turbulence. Then, a PES is measured again to be compared with the reference value. If the PES is less than the reference value as a comparison result, the process returns to S1920. On the other hand, if the PES is equal to or more than the reference value, and if the PES is equal to or less than the reference value, S1970 may be performed with respect to a data sector having undergone PES measurement.

FIG. 20 is a flowchart showing S1970 of FIG. 19 in more details.

Referring to FIGS. 11 to 13B and FIG. 20, the defect management unit 1114 may store, in the test list 1122, information regarding at least one data sector to be determined whether it is defective or not (S2010). If the virtual band including at least one data sector to be determined whether it is defective or not is changed to a free band not including valid data (S2020), the defect management unit 1114 may test whether the at least one data sector is defective or not (S2030). For instance, the defect management unit 1114 may transmit, to the read/write controller 1115, a signal for testing whether the at least one data sector is defective or not. The read/write controller 1115 may output, to the storage medium interface 1130, a control signal (CON) for writing the test pattern on the at least one data sector to be determined whether it is defective or not, in response to the signal received from the defect management unit 1114. The storage medium interface 1130 may write the test pattern in response to the received control signal (CON), on the at least one data sector to be determined whether it is defective or not. After writing the test pattern, the read/write controller 1115 may output, to the storage medium interface 1130, a control signal (CON) for reading the test pattern stored on the at least one data sector to be determined whether it is defective or not. The storage medium interface 1130 may read the test pattern from the at least one data sector to be determined whether it is defective or not, in response to the received control signal (CON). The defect management unit 1114 may determine at least one data sector on which the test pattern has not been written, or the at least one data sector of which read test pattern is not identical to the written test pattern, as a defective data sector. And, the defect management unit 1114 may store information regarding the at least one defective data sector in the defect list 1123 (S2040). As aforementioned, data sector corresponding to the information stored in the defect list 1123 is not used later. Therefore, the data sector corresponding to the information stored in the defect list 1123 cannot undergo a write operation even if a write command is applied.

Figure 21:
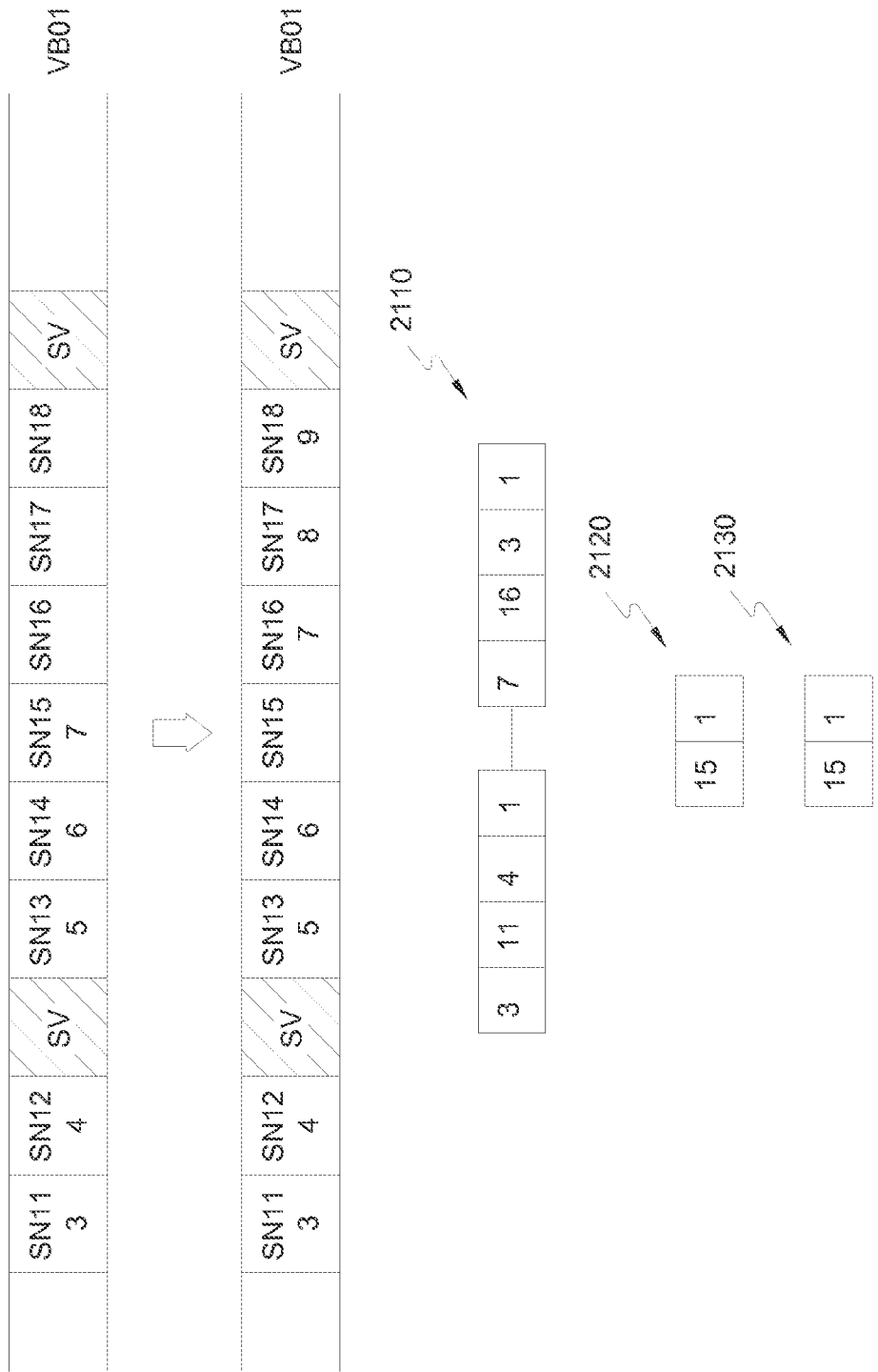
FIG. 21 is a flowchart showing an embodiment of a method for controlling a write operation of FIGS. 19 and 20.

FIG. 21 is a view showing an embodiment of the method for controlling a write operation of FIGS. 19 and 20. Hereinafter, the method for controlling a write operation according to an embodiment of the present invention will be explained with reference to FIGS. 11 to 13B, and FIGS. 19 to 21.

Virtual band (VB01) may include a plurality of servo areas (SV) and a plurality of data sectors (SN11, SN12, ... ). It is assumed that data is written to the right from the left in FIG. 21. For instance, servo information regarding 7 data sectors (SN13~SN18) may be stored at servo area (SV) between data sector (SN12) and data sector (SN13). With regard to FIG. 21, it is assumed that a write command has been applied, the write command instructing writing data corresponding to logical block addresses (LBA3~LBA9) starting from data sector (SN11) corresponding to virtual address (VA"11"). And, it is assumed that an error has occurred on data sector (SN15) corresponding to virtual address (VA"15") while the write operation is performed on data sectors starting from data sector (SN11) corresponding to virtual address (VA"11").

In this case, a write retry operation may be performed on the data sector (SN15), and the counter 1111 may count the number of times (frequency) of the write retry operation. If the number of times of the write retry operation on the data sector (SN15) is the 'k' as a determination result by the comparator 1112, the data sector (SN15) corresponds to the first data sector. Since the first data sector exists in S1940 of FIG. 19, first data (data corresponding to LBA7~LBA9) to be written starting from the first data sector may be written on data sectors starting from second data sector (SN16) in S1950.

FIG. 21 illustrates a case where the first data and the second data are the same, and the second data sector is adjacent to the first data sector in a data write direction.

In S1960, the mapping information management unit 1113 may generate mapping information regarding written data, and may store the generated mapping information in the mapping table 1121. That is, the mapping information management unit 1113 may generate mapping information 2110, the mapping information indicating that 4 data starting from data corresponding to LBA "3" is sequentially stored in 4 data sectors starting from data sector corresponding to VA "11" of virtual band (VB01), and 3 data starting from data corresponding to LBA "7" is sequentially stored in 3 data sectors starting from data sector corresponding to VA "16" of virtual band (VB01). For convenience, it is assumed that the mapping information 1200 of FIG. 12 is stored in the mapping table 1121. However, the present invention is not limited to this. That is, other types of information may be stored in the mapping table 1121.

The defect management unit 1114 may store, in the test list 1122, information regarding data sector (SN15) to be determined whether it is defective or not, before determining with respect to occurrence of a defect as aforementioned with reference to FIG. 20. That is, the defect management unit 1114 may generate mapping information 2120 and store the mapping information 2120 in the test list 1122, the mapping information 2120 indicating that data sector corresponding to VA"15" of VB01 is to be determined whether it is defective or not.

After the defect management unit 1114 has determined with respect to occurrence of a defect as aforementioned with reference to FIG. 20, information regarding the data sector (SN15) determined as a defective data sector may be stored in the defect list 1123. That is, the defect management unit 1114 may generate information 2130 and store the mapping information 2130 in the defect list 1123, the mapping information 2130 indicating that data sector corresponding to VA"15" of VB01 is a defective data sector.

It was assumed that the same information as the information of FIG. 13B is stored in the test list 1122 and the defect list 1123. However, the present invention is not limited to this. That is, other types of information may be stored in the test list 1122 and the defect list 1123.

Figure 22:
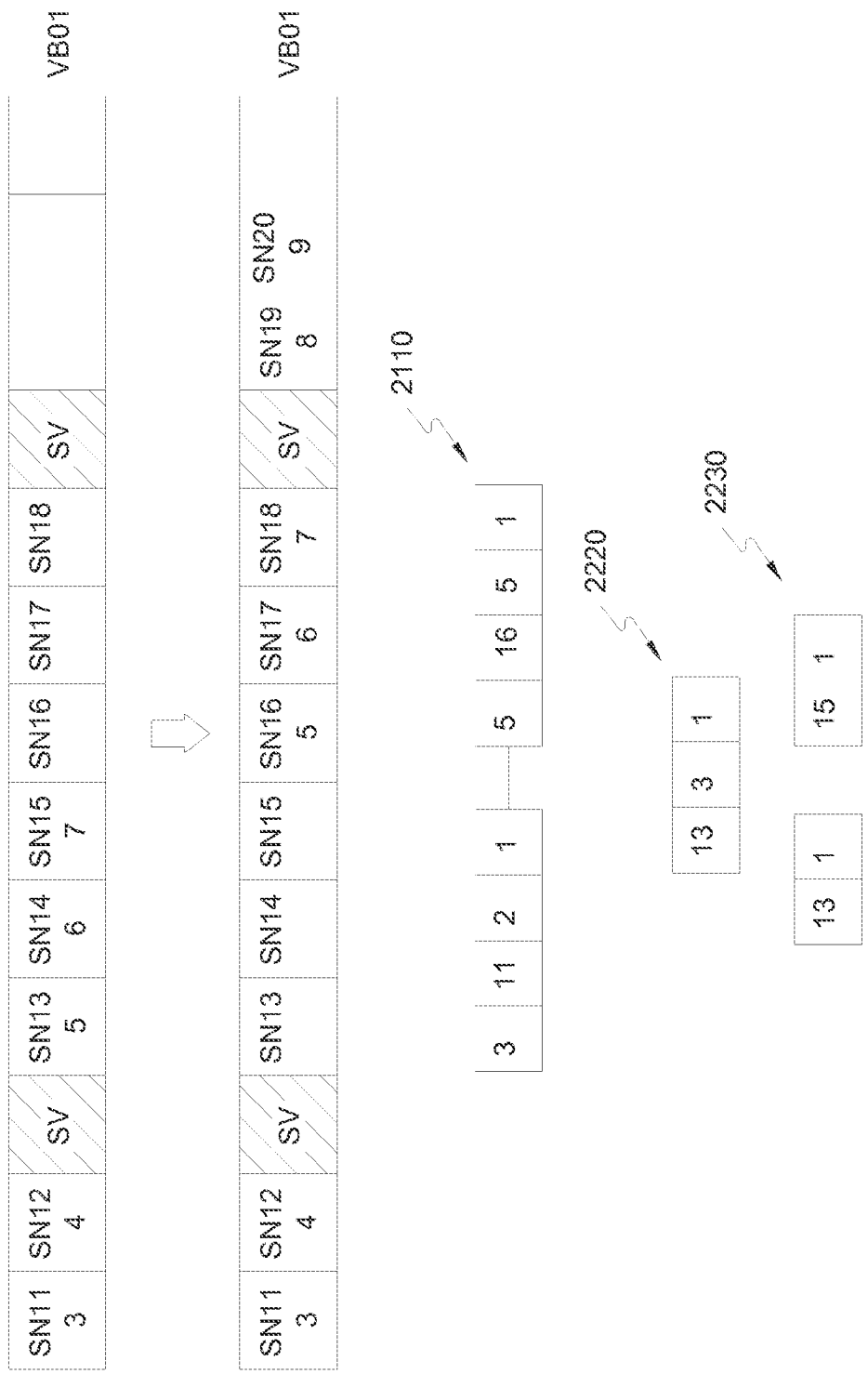
FIG. 22 is a flowchart showing another embodiment of a method for controlling a write operation of FIGS. 19 and 20.

FIG. 22 is a view showing another embodiment of the method for controlling a write operation of FIGS. 19 and 20. Hereinafter, the method for controlling a write operation according to another embodiment of the present invention will be explained with reference to FIGS. 11 to 13B, and FIGS. 19 to 22.

Virtual band (VB01) may include a plurality of servo areas (SV) and a plurality of data sectors (SN11, SN12, ... ). It is assumed that data is written to the right side from the left side in FIG. 22. For instance, servo information regarding 7 data sectors (SN13~SN18) may be stored at servo area (SV) between data sector (SN12) and data sector (SN13). With regard to FIG. 22, it is assumed that a write command has been applied, the write command instructing writing data corresponding to logical block addresses (LBA3~LBA9) starting from data sector (SN11) corresponding to virtual address (VA"11"). And, it is assumed that an error has occurred on data sector (SN15) corresponding to virtual address (VA"15") while the write operation is performed on data sectors starting from data sector (SN11) corresponding to virtual address (VA"11").

In this case, a write retry operation may be performed on the data sector (SN15), and the counter 1111 may count the number of times (frequency) of the write retry operation. If the number of times of the write retry operation on the data sector (SN15) is the 'k' as a determination result by the comparator 1112, the data sector (SN15) corresponds to the first data sector. Since the first data sector exists in S1940 of FIG. 19, first data (data corresponding to LBA7~LBA9) to be written on data sectors starting from the first data sector may be written on data sectors starting from second data sector (SN16) in S1950.

More specifically, in FIG. 22, the second data may include third data and the first data. Here, the third data indicates data written on third data sectors (SN13, SN14) positioned between servo area (SV) where servo information regarding the first data sector (SN15) is stored, and the first data sector (SN15). And, the second data sector may be a data sector adjacent to the first data sector in a data write direction.

In S1960, the mapping information management unit 1113 may generate mapping information regarding written data, and may store the generated mapping information in the mapping table 1121. That is, the mapping information management unit 1113 may generate mapping information 2210, the mapping information indicating that 2 data starting from data corresponding to LBA "3" is sequentially stored in 2 data sectors starting from data sector corresponding to VA "11" of virtual band (VB01), and 5 data starting from data corresponding to LBA "5" is sequentially stored in 5 data sectors starting from data sector corresponding to VA "16" of virtual band (VB01). For convenience, it is assumed that the mapping information 1200 of FIG. 12 is stored in the mapping table 1121. However, the present invention is not limited to this. That is, other types of information may be stored in the mapping table 1121.

The defect management unit 1114 may store, in the test list 1122, information regarding data sectors (SN13, SN14, SN15) to be determined whether they are defective or not, before determining with respect to occurrence of a defect as aforementioned with reference to FIG. 20. That is, the defect management unit 1114 may generate mapping information 2220 and store the mapping information 2220 in the test list 1122, the mapping information 2220 indicating that 3 data sectors starting from data sector corresponding to VA"13" of VB01 is to be determined whether it is defective or not.

After the defect management unit 1114 has determined with respect to the occurrence of a defect as aforementioned with reference to FIG. 20, information regarding data sectors (SN13, SN15) determined as defective data sectors may be stored in the defect list 1123. That is, the defect management unit 1114 may generate information 2230 and store the mapping information 2230 in the defect list 1123, the mapping information 2230 indicating that data sectors corresponding to VA"13" and VA"15" of VB01 are defective data sectors.

It was assumed that the same information as the information of FIG. 13A is stored in the test list 1122 and the same information as the information of FIG. 13B is stored in the defect list 1123. However, the present invention is not limited to this. That is, other types of information may be stored in the test list 1122 and the defect list 1123.

Figure 23:
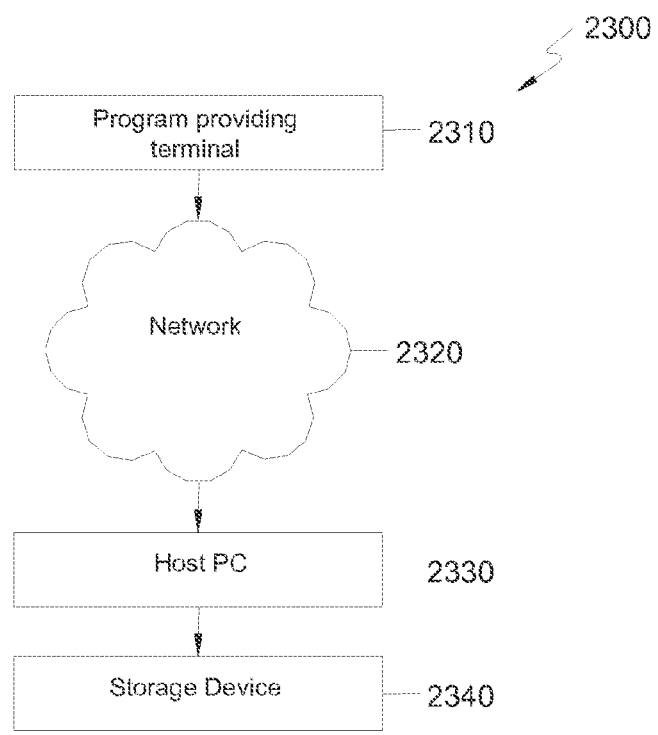
FIG. 23 is a view showing a network configuration for explaining a method for controlling a read operation or a write operation of a storage device through a network according to an embodiment of the present invention.

FIG. 23 is a network configuration view for explaining a method for controlling a read operation or a write operation by a storage device through a network according to an embodiment of the present invention.

Referring to FIG. 23, a network system 2300 may include a program providing terminal 2310, a network 2320, a host PC 2330 and a storage device 2340.

The network 2320 may be implemented as a communication network such as Internet, and may be implemented as a wireless communication network as well as a wired communication network.

The program providing terminal 2310 stores therein programs for controlling a read operation of FIGS. 14 to 16, and programs for controlling a write operation of FIGS. 19 and 20. The program providing terminal 2310 transfers the programs for controlling a read operation or a write operation, to the host PC 2330 connected thereto via the network 2320.

The host PC 2330 is provided with hardware and software capable of requesting programs for controlling a read operation or a write operation, after the host PC 2330 accesses the program providing terminal 2310 via the network 2320, and capable of downloading the requested programs from the program providing terminal 2310. And, the host PC 2330 controls the storage device 2340 to execute, based on the programs downloaded from the program providing terminal 2310, the method for controlling a read operation of FIGS. 14 to 16 and the method for controlling a write operation of FIGS. 19 and 20.

The method for controlling a read operation according to an embodiment of the present invention was explained with reference to FIGS. 14 to 16, and the method for controlling a write operation according to an embodiment of the present invention was explained with reference to FIGS. 19 and 20. Therefore, detailed explanations thereof will be omitted.

An embodiment may be a method for controlling a read operation in a virtual band including a plurality of tracks, the method comprising: if an error occurs during a read operation at a first area of the virtual band in response to a read command, performing a read retry operation; performing the read retry operation 'n' times or more than ('n' is natural number), and thereby writing data read from the first area on a second area of the virtual band or another virtual band, the second area on which data can be consecutively written; if the read command is received again, performing a read operation at the second area in response to the read command. The embodiment may include wherein the first area includes at least one data sector among data sectors of the virtual band, and wherein the second area includes at least one data sector adjacent to data-stored last data sector of the virtual band or the another virtual band, the at least one data sector having no Adjacent Track Interference (ATI), and the at least one data sector on which the read data can be consecutively written, or the second area includes at least one data sector of the another virtual band where valid data has not been stored. The embodiment may further comprise: storing, in a test list, information regarding at least one data sector included in the first area; and if the virtual band including the first area is changed to a free band not including valid data, determining whether the at least one data sector of the first area is defective or not based on the information stored in the test list. The embodiment may include wherein the step of determining whether the at least one data sector of the first area is defective or not includes: testing whether the at least one data sector is defective or not, using a test pattern; and storing information regarding the at least one data sector determined as a defective data sector as a test result, in a defect list where data sectors not to be used later are stored. The method may include wherein the step of testing whether the at least one data sector is defective or not includes: writing the test pattern, on the at least one data sector of the first area; reading the written test pattern; and comparing the read test pattern with the written test pattern, thereby determining whether the at least one data sector of the first area is defective or not. The embodiment may include wherein the step of writing comprises: comparing the 'n' determined with consideration of the number of entire data sectors, time duration for which the entire data sectors can be read, and a probability of occurrence of a read error, with the number of times that the read retry operation has been performed; and if the number of times of the read retry operation is the 'n' or more than, and if the data has been read, writing the read data to the second area. The embodiment may further comprise: if the data is not read from the first area after the read retry operation has been performed 'm' times ('m' is natural number more than the 'n'), storing, in a test list, information regarding the at least one data sector included in the first area; and if the virtual band including the first area is changed to a free band not including valid data, determining whether the at least one data sector of the first area is defective or not based on the information stored in the test list. The embodiment may include wherein the step of determining whether the at least one data sector is defective or not includes: testing whether the at least one data sector of the first area is defective or not, using a test pattern; and storing information regarding the at least one data sector determined as a defective data sector as a test result, in a defect list where data sectors not to be used later are stored. The embodiment may include wherein the step of testing whether the at least one data sector is defective or not includes: writing the test pattern, on the at least one data sector of the first area; reading the written test pattern; and comparing the read test pattern with the written test pattern, thereby determining whether the at least one data sector of the first area is defective or not. The embodiment may include wherein the step of storing information in the test list comprises: comparing the 'm' determined with consideration of a maximum number of times of the read retry operation, with the number of times that the read retry operation has been performed; and if the number of times that the read retry operation has been performed is the 'm' and the data has not been read, storing information regarding the at least one data sector of the first area in a test list. The embodiment may further comprise changing the mapping information regarding the read data in case of performing the writing, wherein in the step of performing a read operation at the second area, a read operation is performed at the second area based on the changed mapping information when the read command is received again. The embodiment may include wherein the step of changing the mapping information includes: deleting, from a mapping table, mapping information between at least one logical block address corresponding to the read data and at least one virtual address corresponding to the first area; and generating mapping information between the at least one logical block address and at least one virtual address corresponding to the second area, and storing the generated mapping information in the mapping table. The embodiment may further comprise if the virtual band including the first area is changed to a free band not including valid data, testing whether a read operation is normally performed on at least one servo area included in the virtual band; and storing information regarding data sectors corresponding to the at least one servo area on which servo information is not normally read, in a defect list where data sectors not to be used later are stored. The embodiment may include wherein each of the tracks of the virtual band partially overlaps a neighboring track, and data is written on each of the tracks by using a shingle write method for consecutively writing data in one direction.

In some embodiments, a method for controlling a write operation in a virtual band including a plurality of tracks may comprise: if an error occurs during a write operation at a first area of the virtual band in response to a write command, performing a write retry operation; and writing second data on data sectors starting from a second data sector subsequent to a first data sector, the second data including first data to be written on the data sectors starting from the first data sector, the first data sector where the write retry operation has been performed 'k' times ('k' is natural number). The embodiment may include wherein the second data sector is positioned to be adjacent to the first data sector in a direction to write data in response to the write command. The embodiment may include wherein the second data includes the first data, and third data written on at least one third data sector positioned before the first data sector. The embodiment may include wherein the third data is data written on at least one third data sector positioned between a servo area where servo information regarding the first data sector has been stored and the first data sector. The embodiment may further comprise: storing, in a test list, information regarding at least one data sector among the data sectors, the at least one data sector to be determined whether it is defective or not; and if the virtual band including the at least one data sector is changed to a free band not including valid data, determining whether the at least one data sector is defective or not based on the information stored in the test list. The embodiment may include wherein the step of determining whether the at least one data sector is defective or not includes: testing whether the at least one data sector is defective or not, using a test pattern; and storing information regarding the at least one data sector determined as a defective data sector as a test result, in a defect list where data sectors not to be used later are stored. The embodiment may include wherein the step of testing whether the at least one data sector is defective or not includes: writing the test pattern, on the at least one data sector; reading the written test pattern; and comparing the read test pattern with the written test pattern, thereby determining whether the at least one data sector of the first area is defective or not. The embodiment may include, wherein the second data includes the first data, and third data written on at least one third data sector positioned before the first data sector, and wherein the information regarding the at least one data sector includes information regarding the first data sector, and information regarding the at least one third data sector. The embodiment may include, wherein the third data is data written on at least one third data sector positioned between a servo area where servo information regarding the first data sector has been stored and the first data sector. The embodiment may include, wherein the information regarding the at least one data sector includes information regarding the first data sector. The embodiment may include, wherein the step of writing second data on data sectors starting from a second data sector includes: if a last data sector of the virtual band on which the write operation is performed is the first data sector, writing the second data on data sectors of another virtual band starting from a second data sector. The embodiment may include, wherein the step of writing second data on data sectors starting from a second data sector includes: comparing the number of times that the write retry operation has been performed with the 'k' determined with consideration of Track Per Inch (TPI); and determining a data sector on which the write retry operation has been performed the 'k' times, as a first data sector. The embodiment may include, further comprising generating mapping information regarding data corresponding to the write command. The embodiment may include, wherein the step of generating mapping information includes storing, in a mapping table, mapping information between at least one logical block address of data corresponding to the write command, and a virtual address of at least one data sector on which data corresponding to the write command is written. The embodiment may include, further comprising if the virtual band including the first data sector is changed to a free band not including valid data, testing whether a read operation is normally performed on at least one servo area included in the virtual band; and storing information regarding data sectors corresponding to the at least one servo area on which servo information is not normally read, in a defect list where data sectors not to be used later are stored. The embodiment may further comprise measuring a position error signal (PES) during the write retry operation; comparing the measured PES with a reference value; if the measured PES is more than the reference value, waiting for a preset time, then re-measuring a PES and comparing the re-measured PES with the reference value; and if the PES is less than the reference value, performing the write retry operation again. The embodiment may further comprise storing, in a test list, information regarding at least one data sector of which measured PES is more than the reference value; if the virtual band including the at least one data sector is changed to a free band not including valid data, determining whether the at least one data sector is defective or not based on the information stored in the test list. The embodiment may include, wherein each of the tracks of the virtual band partially overlaps a neighboring track, and data is written thereon by a shingle write method for consecutively writing data in one direction.

In some embodiments, a storage device may comprise: a storage medium including at least one virtual band having a plurality of tracks where data is stored; a storage medium interface configured to read data stored in the storage medium, or to write data on the storage medium; and a processor configured to control the storage medium interface, wherein the processor includes a read/write controller configured to control the storage medium interface to write data read from a first area of the virtual band, to a second area of the virtual band or another virtual band by performing a read retry operation 'n' times or more than ('n' is natural number), the second area where data can be consecutively written, the read/write controller also configured to control the storage medium interface to perform a read operation at the second area if a read command for reading the written data is received. The embodiment may include, wherein the first area includes at least one data sector among data sectors of the virtual band, and wherein the second area includes at least one data sector adjacent to data-stored last data sector of the virtual band or the another virtual band, the at least one data sector having no Adjacent Track Interference (ATI), and the at least one data sector on which the read data can be consecutively written, or the second area includes at least one data sector of the another virtual band where valid data has not been stored. The embodiment may include, wherein the processor further includes a defect management unit configured to store, in a test list, information regarding at least one data sector included in the first area, and the defect management unit configured to determine whether the at least one data sector of the first area is defective or not based on the information stored in the test list, if the virtual band including the first area is changed to a free band not including valid data. The embodiment may include, wherein the defect management unit is configured to test whether the at least one data sector of the first area is defective or not using a test pattern, and is configured to store information regarding the at least one data sector determined as a defective data sector, in a defect list where data sectors not to be used later are stored. The embodiment may include, wherein the read/write controller is configured to control the storage medium interface to write the test pattern on the at least one data sector of the first area, and then to read the written test pattern, and wherein the defect management unit is configured to compare the read test pattern with the written test pattern, thereby to determine whether the at least one data sector of the first area is defective or not. The embodiment may include, wherein the processor further includes: a counter configured to count the number of times that the read retry operation has been performed; and a comparator configured to compare the 'n' determined with consideration of the number of entire data sectors, time duration for which the entire data sectors can be read, and a probability of occurrence of a read error, with the number of times that the read retry operation has been performed. The embodiment may include, wherein the processor further includes a defect management unit configured to store information, in a test list, information regarding the at least one data sector included in the first area if the data is not read from the first area after the read retry operation has been performed 'm' times ('m' is natural number more than the 'n'), and the defect management unit configured to determine whether the at least one data sector of the first area is defective or not based on the information stored in the test list, if the virtual band including the first area is changed to a free band not including valid data. The embodiment may include wherein the defect management unit is configured to test whether the at least one data sector of the first area is defective or not using a test pattern, and is configured to store information regarding the at least one data sector determined as a defective data sector, in a defect list where data sectors not to be used later are stored. The embodiment may include, wherein the read/write controller is configured to control the storage medium interface to write the test pattern on the at least one data sector of the first area, and then to read the written test pattern, and wherein the defect management unit is configured to compare the read test pattern with the written test pattern, thereby to determine whether the at least one data sector of the first area is defective or not. The embodiment may include, wherein the processor further includes: a counter configured to count the number of times that the read retry operation has been performed; and a comparator configured to compare the 'n' determined with consideration of a maximum number of times of the read retry operation, with the number of times that the read retry operation has been performed. The embodiment may include, wherein the processor further includes a mapping information management unit configured to change mapping information regarding the read data, if the storage medium interface has written the read data on the second area, and wherein the read/write controller is configured to control the storage medium interface to perform a read operation at the second area based on the mapping information when the read command is received again. The embodiment may include, wherein the mapping information management unit is configured to delete, from a mapping table, mapping information between at least one logical block address corresponding to the read data and at least one virtual address corresponding to the first area, and is configured to generate mapping information between the at least one logical block address and at least one virtual address corresponding to the second area, and to store the generated mapping information in the mapping table. The embodiment may include, wherein the processor further includes a defect management unit configured to store information regarding data sectors corresponding to at least one servo area included in the virtual band, on which servo information is not normally read, in a defect list where data sectors not to be used later are stored, if the virtual band including the first area is changed to a free band not including valid data. The embodiment may include, wherein each of the tracks of the virtual band partially overlaps a neighboring track, and data is written thereon by a shingle write method for consecutively writing data in one direction.

In some embodiments, a storage device may comprise: a storage medium including at least one virtual band having a plurality of tracks where data is stored; a storage medium interface configured to read data stored in the storage medium, or to write data on the storage medium; and a processor configured to control the storage medium interface, wherein the processor includes a read/write controller configured to control the storage medium interface to write second data on data sectors starting from a second data sector subsequent to a first data sector, the second data including first data to be written on the data sectors starting from the first data sector on which the write retry operation has been performed 'k' times ('k' is natural number). The embodiment may include, wherein the second data sector is adjacent to the first data sector in a direction to write the data in response to the write command. The embodiment may include, wherein the second data includes the first data, and third data written on at least one third data sector positioned before the first data sector. The embodiment may include, wherein the third data is data written on at least one third data sector positioned between a servo area where servo information regarding the first data sector has been stored and the first data sector. The embodiment may include, wherein the processor further includes a defect management unit configured to store, in a test list, information regarding at least one data sector included in the data sectors and to be determined whether it is defective or not, and the defect management unit configured to determine whether the at least one data sector of the first area is defective or not based on the information stored in the test list, if the virtual band including the first area is changed to a free band not including valid data. The embodiment may include, wherein the defect management unit is configured to test whether the at least one data sector of the first area is defective or not using a test pattern, and is configured to store information regarding the at least one data sector determined as a defective data sector, in a defect list where data sectors not to be used later are stored. The embodiment may include, wherein the read/write controller is configured to control the storage medium interface to write the test pattern on the at least one data sector, and then to read the written test pattern, and wherein the defect management unit is configured to compare the read test pattern with the written test pattern, thereby to determine whether the at least one data sector of the first area is defective or not. The embodiment may include, wherein the second data includes the first data, and third data written on at least one third data sector positioned before the first data sector, and wherein the information regarding the at least one data sector includes information regarding the first data sector, and information regarding the at least one third data sector. The embodiment may include, wherein the third data is data written on at least one third data sector positioned between a servo area where servo information regarding the first data sector has been stored and the first data sector. The embodiment may include, wherein the information regarding the at least one data sector includes information regarding the first data sector. The embodiment may include, wherein the read/write controller is configured to write the second data on data sectors of another virtual band starting from a second data sector, if a last data sector of the virtual band on which the write operation is performed is the first data sector. The embodiment may include wherein the processor further includes: a counter configured to count the number of times that the write retry operation has been performed; and a comparator configured to compare the number of times that the write retry operation has been performed with the 'k' determined with consideration of Track Per Inch (TPI). The embodiment may include, wherein the processor further includes a mapping information management unit configured to generate mapping information regarding data corresponding to the write command. The embodiment may include, wherein the mapping information management unit is configured to store, in a mapping table, mapping information between at least one logical block address of data corresponding to the write command, and a virtual address of at least one data sector on which data corresponding to the write command is written. The embodiment may include, wherein the processor further includes a defect management unit configured to store information regarding data sectors corresponding to at least one servo area included in the virtual band, the servo area on which servo information is not normally read, in a defect list where data sectors not to be used later are stored, if the virtual band including the first area is changed to a free band not including valid data. The embodiment may include, wherein if the storage medium interface performs the write retry operation, the processor is configured to measure a position error signal (PES) and compare the measured PES with a reference value; if the measured PES is more than the reference value, the processor is configured to wait for a preset time, to re-measure the PES and to compare the re-measured PES with the reference value; and if the PES is less than the reference value, the processor is configured to perform the write retry operation again. The embodiment may include, wherein the processor further includes a defect management unit configured to store, in a test list, information regarding at least one data sector of which measured PES is more than the reference value, and the defect management unit configured to determine whether the at least one data sector is defective or not based on the information stored in the test list, if the virtual band including the at least one data sector is changed to a free band not including valid data. The embodiment may include, wherein each of the tracks of the virtual band partially overlaps a neighboring track, and data is written thereon by a shingle write method for consecutively writing data in one direction.

In some embodiments a method for controlling a read operation in a virtual band including a plurality of tracks on which data is consecutively written in one direction may comprise: if an error occurs during a read operation at a first area of the virtual band in response to a read command, performing a read retry operation; performing the read retry operation 'n' times or more than ('n' is natural number) and 'm' times or less than ('m' is natural number more than the 'n'), and thereby writing data read from the first area of the virtual band on a second area of the virtual band or another virtual band, the second area on which data can be consecutively written; changing mapping information between the read data and the first area, into mapping information between the written data and the second area; and if the virtual band including the first area is changed to a free band not including valid data, in a case where the data is not read from the first area after the read retry operation has been performed the 'm' times, or in a case where the write operation is performed, determining whether the at least one data sector of the first area is defective or not. The embodiment may include, wherein the first area includes at least one data sector among data sectors of the virtual band, and wherein the second area includes at least one data sector adjacent to data-stored last data sector of the virtual band or the another virtual band, the at least one data sector having no Adjacent Track Interference (ATI), and the at least one data sector on which the read data can be consecutively written, or the second area includes at least one data sector of the another virtual band where valid data has not been stored. The embodiment may include, further comprising performing a read operation at the second area based on the mapping information if the read command is received again after performing the writing step and the changing step. The embodiment may include wherein the step of determining whether the at least one data sector is defective or not includes: storing, in a test list, information regarding at least one data sector included in the first area; if the virtual band including the first area is changed to a free band not including valid data, testing whether the at least one data sector of the first area is defective or not, using the information and a test pattern stored in the test list; and storing information regarding the at least one data sector determined as a defective data sector as a test result, in a defect list where data sectors not to be used later are stored. The embodiment may include, wherein the step of changing mapping information includes: deleting, from a mapping table, mapping information between at least one logical block address corresponding to the read data and at least one virtual address corresponding to the first area; and generating mapping information between the at least one logical block address and at least one virtual address corresponding to the second area, and storing the generated mapping information in the mapping table. The embodiment may include, further comprising: if the virtual band including the first area is changed to the free band, testing whether a read operation is normally performed on at least one servo area included in the virtual band; and storing information regarding data sectors corresponding to the at least one servo area on which servo information is not normally read, in a defect list where data sectors not to be used later are stored. The embodiment may include, wherein each of the tracks of the virtual band partially overlaps a neighboring track.

In some embodiments, a computer system may comprise: a host device configured to transmit a command; and a storage medium configured to receive the command, and to perform an operation corresponding to the received command, wherein the storage device is configured to write data read from a first area of a virtual band including a plurality of tracks, to a second area of the virtual band or another virtual band by performing a read retry operation 'n' times or more than ('n' is natural number), the second area where data can be consecutively written, and the storage device configured to perform a read operation at the second area if a read command for reading the written data is received. The embodiment may include, wherein the first area includes at least one data sector among data sectors of the virtual band, and wherein the second area includes at least one data sector adjacent to data-stored last data sector of the virtual band or the another virtual band, the at least one data sector having no Adjacent Track Interference (ATI), and the at least one data sector on which the read data can be consecutively written, or the second area includes at least one data sector of the another virtual band where valid data has not been stored. The embodiment may include, wherein the storage device is configured to store, in a test list, information regarding at least one data sector included in the first area, and is configured to test whether the at least one data sector of the first area is defective or not, using the information stored in the test list, if the virtual band including the first area is changed to a free band not including valid data. The embodiment may include, wherein the storage device is configured to store, in a test list, information regarding the at least one data sector included in the first area if the data is not read from the first area after the read retry operation has been performed 'm' times ('m' is natural number more than the 'n'), and the storage device configured to determine whether the at least one data sector of the first area is defective or not based on the information stored in the test list, if the virtual band including the first area is changed to a free band not including valid data. The embodiment may include, wherein each of the tracks of the virtual band partially overlaps a neighboring track, and data is written thereon by a shingle write method for consecutively writing data in one direction.

In some embodiments, a computer system may comprise: a host device configured to transmit a command; and a storage medium configured to receive the command, and to perform an operation corresponding to the received command, wherein the storage device is configured to write second data on data sectors starting from a second data sector subsequent to a first data sector, the second data including first data to be written on the data sectors starting from the first data sector on which the write retry operation has been performed 'k' times ('k' is natural number). The embodiment may include, wherein the second data sector is adjacent to the first data sector in a direction to write the data in response to the write command. The embodiment may include, wherein the storage device is configured to store information regarding at least one data sector among the data sectors in a test list, the at least one data sector to be determined whether it is defective or not, and is configured to determine whether the at least one data sector is defective or not based on the information stored in the test list, if the virtual band including the at least one data sector is changed to a free band not including valid data. The embodiment may include, wherein the storage device includes tracks partially overlapping neighboring tracks, the tracks on which data is written by a shingle write method for consecutively writing data in one direction.

In some embodiments, a method for controlling a read operation of a storage medium may comprise: downloading a program for controlling a read operation of a storage device via a network; and executing the program for controlling a read operation, wherein the program for controlling a read operation is configured to write data read from a first area of a virtual band including a plurality of tracks, to a second area of the virtual band or another virtual band by performing a read retry operation 'n' times or more than ('n' is natural number), the second area where data can be consecutively written, and the program is configured to perform a read operation at the second area if a read command for reading the written data is received.

In some embodiments, a method for controlling a write operation of a storage medium may comprise: downloading a program for controlling a write operation of a storage device via a network; and executing the program for controlling a write operation, wherein the program for controlling a write operation is configured to write second data on data sectors starting from a second data sector subsequent to a first data sector, the second data including first data to be written on the data sectors starting from the first data sector on which the write retry operation has been performed 'k' times ('k' is natural number).

The present invention may be implemented as a method, an apparatus, a system, etc. If the present invention is implemented as software, the components of the present invention are code segments for executing required operations. Programs or code segments may be stored in a processor readable medium. The processor readable medium may include electronic circuit, semiconductor memory device, ROM, flash memory, erasable ROM (EROM), floppy disk, optical disk, hard disk, etc.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
receiving a command to perform a first operation associated with first data and a first address of a data storage medium, the data storage medium including virtual bands having a plurality of tracks;
performing the first operation at the first address;
retrying the first operation when the first operation did not complete successfully;
when a first threshold of retries of the first operation is exceeded:
storing the first data to a second address; and
testing the first address for defects after a virtual band including the first address no longer contains valid data.

2. The method of claim 1, the first operation including a read command to read the first data from the first address.

3. The method of claim 2 further comprising:
detecting when the first data is successfully read after the first threshold is exceeded, wherein the first threshold indicates the first data should be moved from the first address to the second address;
storing the first data to the second address of the data storage medium after the first data is successfully read; and
updating an address map to reflect the first data as located at the second address.

4. The method of claim 3 further comprising:
ceasing retries of the first operation after a second threshold is exceeded, wherein the second threshold indicates attempts to read the first data from the first address should be stopped; and
testing the first address for defects after the second threshold is exceeded.

5. The method of claim 2 further comprising:
receiving a write command to perform a write operation to record second data at a third address;
performing the write operation at the third address;
retrying the write operation when the write operation did not complete successfully; and
storing the second data to a fourth address when a second threshold of retries of the write operation is exceeded.

6. The method of claim 5 further comprising:
reading third data proximate to the third address when the second threshold is exceeded, and
recording the second data and the third data at the fourth address.

7. The method of claim 5 wherein the fourth address is a next address after the third address that does not contain valid data.

8. The method of claim 1,
the data storage medium including shingled tracks where a first track partially overlaps a second track; and
the method further comprising storing the first data to the second address using shingled recording.

9. The method of claim 1,
testing the first address for defects includes writing a test pattern to the first address; and
performing read operations to read the test pattern.

10. An apparatus comprising:
a processor configured to:
receive a command to perform a first operation associated with first data and a first address of a data storage medium, the data storage medium including virtual bands having a plurality of tracks;
perform the first operation at the first address;
retry the first operation when the first operation did not complete successfully;
when a first threshold of retries of the first operation is exceeded:
store the first data to a second address; and
test the first address for defects after a virtual band including the first address no longer contains valid data.

11. The apparatus of claim 10, the first operation including a read command to read the first data from the first address.

12. The apparatus of claim 11, further comprising the processor configured to:
detect when the first data is successfully read after the first threshold is exceeded, wherein the first threshold indicates the first data should be moved from the first address to the second address;

store the first data to the second address of the data storage medium after the first data is successfully read; and update an address map to reflect the first data as located at the second address.

13. The apparatus of claim 12, further comprising the processor configured to:

cease retries of the first operation after a second threshold is exceeded, wherein the second threshold indicates attempts to read the first data from the first address should be stopped; and test the first address for defects after the second threshold is exceeded.

14. The apparatus of claim 11, further comprising the processor configured to:

receive a write command to perform a write operation to record second data at a third address;

perform the write operation at the third address;

retry the write operation when the write operation did not complete successfully; and store the second data to a fourth address when a second threshold of retries of the write operation is exceeded.

15. The apparatus of claim 10, the first operation includes a write command to record the first data at the first address.

16. The apparatus of claim 15, further comprising the processor configured to:

read second data proximate to the first address when the first threshold is exceeded; and record the second data and the first data at the second address.

17. The apparatus of claim 15, the second address includes a next address after the first address that does not contain valid data.

18. The apparatus of claim 10, the data storage medium including shingled tracks where a first track partially overlaps a second track; and the processor further configured to store the first data to the second address using shingled recording.

19. The apparatus of claim 10, the first threshold is determined based on factors selected from a group consisting of a number of data sectors of the first address, a time duration to read the number of data sectors, and a probability of occurrence of a read error while reading the number of data sectors.

20. An apparatus comprising:

a processor configured to:

receive a read command to perform a read operation associated with first data and a first address of a data storage medium, the data storage medium including virtual bands having a plurality of tracks, the read operation including:

perform the read operation at the first address;

retry the read operation when the read operation did not complete successfully;

when a first threshold of retries of the read operation is exceeded:

store the first data to a second address;

test the first address for defects after a virtual band including the first address no longer contains valid data;

receive a write command to perform a write operation to record second data at a third address;

perform the write operation at the third address;

retry the write operation when the write operation did not complete successfully; and when a second threshold of retries of the write operation is exceeded:

store the second data to a fourth address; and test the third address for defects after a virtual band including the third address no longer contains valid data.

* * * * *